United States Patent
Arai

(10) Patent No.: US 8,099,140 B2
(45) Date of Patent: Jan. 17, 2012

(54) WIRELESS POWER SUPPLY SYSTEM AND WIRELESS POWER SUPPLY METHOD

(75) Inventor: Yasuyuki Arai, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 801 days.

(21) Appl. No.: 11/942,802

(22) Filed: Nov. 20, 2007

(65) Prior Publication Data

US 2008/0122297 A1 May 29, 2008

(30) Foreign Application Priority Data

Nov. 24, 2006 (JP) ................................ 2006-316750

(51) Int. Cl.
*H04B 1/38* (2006.01)

(52) U.S. Cl. .................. 455/573; 455/343.1; 455/343.3; 307/104

(58) Field of Classification Search .................. 455/572, 455/573, 343.1–343.6; 307/104, 154
See application file for complete search history.

(56) References Cited

U.S. PATENT DOCUMENTS

| | | | |
|---|---|---|---|
| 6,212,410 B1 * | 4/2001 | Ishida | 455/572 |
| 6,445,936 B1 * | 9/2002 | Cannon et al. | 455/573 |
| 6,522,955 B1 * | 2/2003 | Colborn | 700/286 |
| 6,665,549 B1 * | 12/2003 | Reed | 455/573 |
| 6,775,562 B1 * | 8/2004 | Owens et al. | 455/572 |
| 6,832,107 B2 * | 12/2004 | Mashiko | 455/573 |
| 7,068,991 B2 * | 6/2006 | Parise | 455/343.1 |
| 7,451,839 B2 * | 11/2008 | Perlman | 180/2.1 |
| 7,696,718 B2 * | 4/2010 | Suzuki | 320/108 |
| 2004/0067412 A1 * | 4/2004 | Shimizu et al. | 429/92 |
| 2004/0142733 A1 * | 7/2004 | Parise | 455/572 |
| 2004/0185917 A1 * | 9/2004 | Fischedick et al. | 455/574 |
| 2006/0229112 A1 * | 10/2006 | Forro | 455/573 |
| 2007/0216348 A1 | 9/2007 | Shionoiri et al. | |
| 2007/0229279 A1 | 10/2007 | Yamazaki et al. | |
| 2007/0278998 A1 | 12/2007 | Koyama | |
| 2008/0024091 A1 | 1/2008 | Yamazaki et al. | |
| 2008/0252254 A1 | 10/2008 | Osada | |
| 2009/0170569 A1 * | 7/2009 | Anzai et al. | 455/573 |

FOREIGN PATENT DOCUMENTS

JP  2003-299255  10/2003

* cited by examiner

*Primary Examiner* — Edward Urban
*Assistant Examiner* — Rui Hu
(74) *Attorney, Agent, or Firm* — Husch Blackwell LLP

(57) ABSTRACT

An object is to provide a system for improving convenience for users, by which a portable electronic device or the like can be charged even in a place where utility power is not available. Another object is to provide a system which allows a service provider to easily perform customer management. A wireless power supply system includes a power storage device having a power storage portion, a terminal charging device for wirelessly supplying electric power to the power storage device, and a management server having user information. Electric power can be supplied to specified users by intercommunication of user information between the power storage device and the terminal charging device and between the terminal charging device and the management server.

21 Claims, 18 Drawing Sheets

WIRELESS POWER SUPPLY SYSTEM AND WIRELESS POWER SUPPLY METHOD

BACKGROUND OF THE INVENTION

1. Field of the Invention

The present invention relates to a system for charging a power storage device. The present invention specifically relates to a wireless power supply system and a wireless power supply method for charging a power storage device using electric waves.

2. Description of the Related Art

At various scenes of social life, the processing of information through a computer network is performed, and the realization of a ubiquitous society where convenience of the processing of information through a computer network can be enjoyed is approaching. The word "ubiquitous" comes from the Latin meaning "existing or being everywhere" (being omnipresent) and is used in a sense that the processing of information using computers is naturally widespread throughout a living environment without any awareness of computers at anytime or anywhere.

A portable electronic device such as a cellular phone requires a battery charger for charging a built-in battery. Electric power that is necessary for a charger is received from utility power distributed to each house. In other words, in order to charge a built-in battery of a portable electronic device, the portable electronic device needs to be set in a battery charger and a power supply cord (plug) of the battery charger needs to be plugged into an outlet. Accordingly, there is normally a problem in that a charging operation for a portable electronic device cannot be performed in a place where utility power is not available. Therefore, in order to enable a charging operation for a portable electronic device even in a place where utility power is not available, a portable charging device is thought of, which is charged with externally supplied electric energy without contact, stores the electric energy, and outputs the electric energy at the time of charging (for example, refer to Japanese Published Patent Application No. 2003-299255).

SUMMARY OF THE INVENTION

However, a conventional portable charging device has a problem in that an unspecified number of users can gain electric energy which is supplied from an external device if they have a means to receive the electric energy. On the other hand, a service provider who intends to supply charging electric power to specific customers has a desire to limit who is to receive the supply of charging electric power.

Thus, it is an object of the present invention to provide a system for improving convenience for users, by which a portable electronic device or the like can be charged even in a place where utility power is not available. It is another object to provide a system which allows a service provider to easily perform customer management.

The subject matter of the present invention relates to a wireless power supply system which includes a management server, a terminal charging device connected to the management server via a communication line, and a power storage device that is charged by the terminal charging device without contact.

The management server has a communication portion which transmits and receives information to and from the terminal charging device, a first storage medium which stores user identification information, and a second storage medium which stores usage information of electric power charging.

The terminal charging device has a terminal communication portion which communicates with the management server, a power signal transmission portion which transmits electric power to the power storage device, a measuring portion which measures the amount of electric power supplied to the power storage device, and an antenna which communicates with the power storage device and transmits electric power to the power storage device. The power storage device has a memory portion which stores identification information, an antenna which receives electromagnetic waves that are transmitted from the terminal charging device, and a power storage portion which stores the electromagnetic waves that are received by the antenna as electric power.

When the power storage device which stores electric power generated from electric waves that are received from the terminal power storage device has the memory portion which stores identification information and the terminal charging device and the management server which have obtained the identification information cooperate with each other, a customer to be served can be identified.

The subject matter of the present invention also relates to a wireless power supply method for managing power supply in a system which includes a management server including a storage medium storing user identification information, a terminal charging device connected to the management server via a communication line, and a power storage device configured to be charged by the terminal charging device without contact.

The wireless power supply method is a method including the steps of: reading identification information stored in a memory portion of the power storage device, determining validity of the identification information, and making the terminal charging device operate to supply electric power to an effective power storage device. By determination on the identification information obtained from the power storage device in the management server about whether or not to operate the terminal charging device, a service can be provided for specific customers.

According to the present invention, a user can be identified, and a power storage device of the user can be charged. In this case, since an identification number is stored in the power storage device and registered with the management server in advance, a user does not need to perform any troublesome operation in charging. In addition, convenience for users can be increased because charging can be performed without contact and thus there is no need to carry around a heavy AC adaptor or secondary battery. On the other hand, a provider can offer a service to specific customers so that the provider can meet customers' needs and can unify management of customer information such as billing.

DETAILED DESCRIPTION OF THE INVENTION

Figure 1:
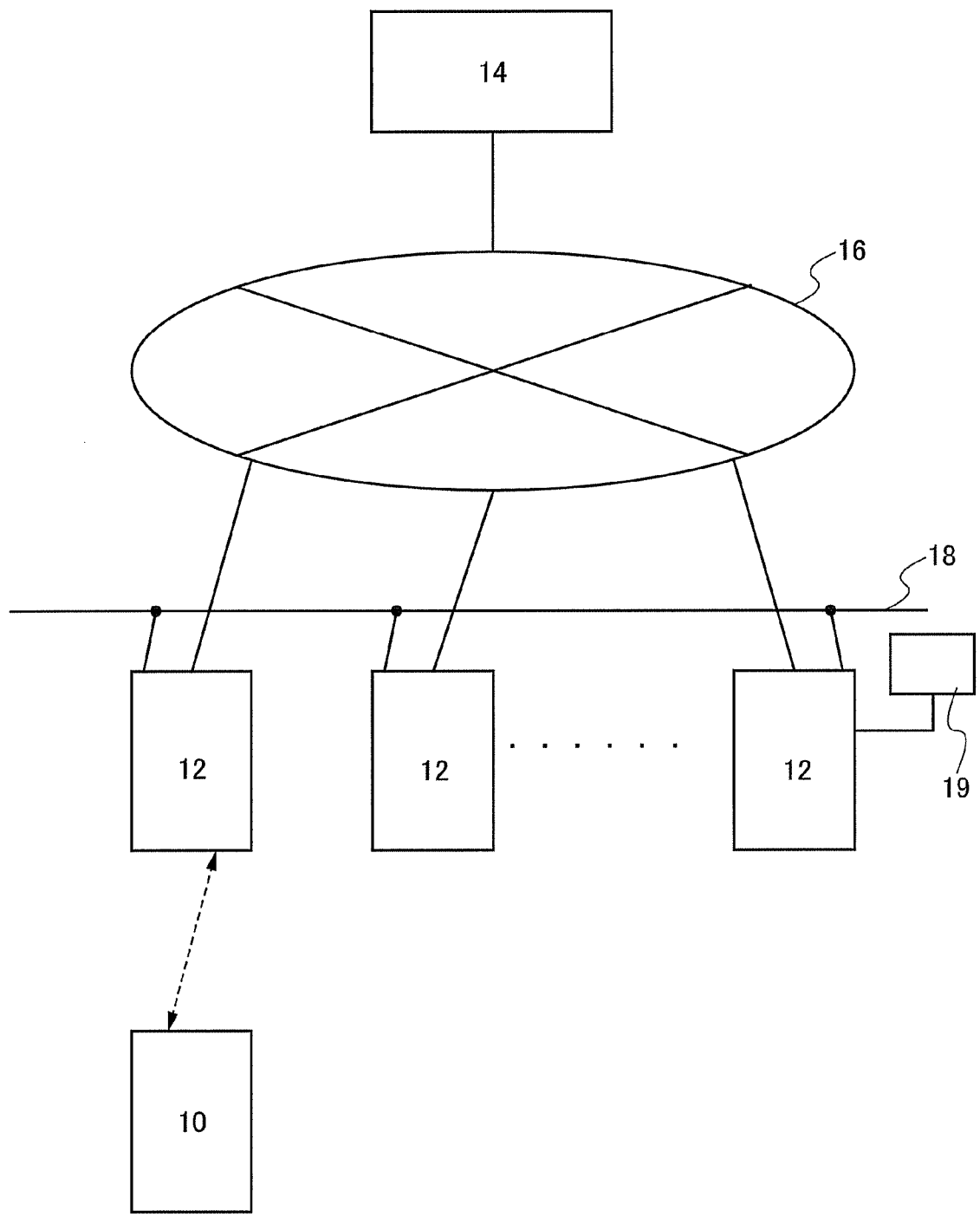
FIG. 1 is a diagram showing a structure of a wireless power supply system according to Embodiment Mode 1.

Embodiment modes of the present invention are hereinafter described with reference to the accompanying drawings. Note that the present invention can be carried out in many different modes, and it is to be easily understood by those skilled in the art that the mode and details of the present invention can be variously changed without departing from its spirit and scope. Therefore, the present invention should not be interpreted as being limited to the description in the embodiment modes. Note that the same portions or portions having similar functions in the diagrams below are denoted by the same reference numerals, and repetitive explanation thereof is omitted.

Embodiment Mode 1

This embodiment mode describes a wireless power supply system with reference to FIG. 1. This wireless power supply system has a power storage device 10 and a terminal charging device 12 as components. The terminal charging device 12 may be connected to a management server 14. The power storage device 10 functions to store electric power and is charged by receiving electric waves which are supplied from the terminal charging device 12. The power storage device 10 can be carried around by a user. The power storage device 10 is present in a living space in a distributed manner by being carried around arbitrarily by a user. The power storage device 10 can be charged while within a range where it can receive electric waves which are transmitted from the terminal charging device 12.

One or more terminal charging devices 12 are prepared. The installation site of the terminal charging device 12 may be determined in consideration of convenience for a user of the power storage device 10. Because the range that the single terminal charging device 12 can cover is limited and affected by ambient environment, a certain area may be covered using a plurality of terminal charging devices 12. The terminal charging device 12 may be installed either inside or outside of various buildings, such as train stations, bus stops, airports, other public facilities, commercial buildings, accommodation facilities, stores, and shopping malls. In addition, it may be installed in telephone poles, traffic lights, and cellular base stations.

The terminal charging device 12 is connected to a power supply network 18 to supply electric power to the user of the power storage device 10. If the terminal charging device 12 is not connected to the power supply network 18, it may be connected to a power generating system 19 that uses natural energy such as sunlight, wind, or geothermal heat. By using natural energy, the terminal charging device 12 can be installed in mountain areas and remote areas where a power grid is not laid.

The amount of electric power consumed by the user of the power storage device 10 is managed by the management server 14. The management server 14 has a communication function to transmit and receive information to and from the terminal charging device 12 and a function to store user identification information and/or usage information of power charging. The management server 14 may be connected to the terminal charging device 12 via a communication network 16 through which they can intercommunicate information. The communication network 16 may be a dedicated communication line or a communication line using a utility power network as well as an information network such as a telephone line or the Internet. Note that a plurality of management servers 14 may be connected to the communication network 16. Preparation of the plurality of management servers 14 allows for the use of this wireless power supply system by a plurality of users at the same time.

In the wireless power supply system, the management server 14 and the terminal charging device 12 operate in cooperation with each other to supply electric power to the power storage device 10. This wireless power supply system allows the user of the power storage device 10 to receive a supply of power wirelessly at various locations in living space. A manager (service provider or the like) of the management server 14 can manage the amount of electric power obtained by users through a communication network and can estimate a demand by statistical processing of usage as well as charge for usage and the like.

Embodiment Mode 2

Figure 2:
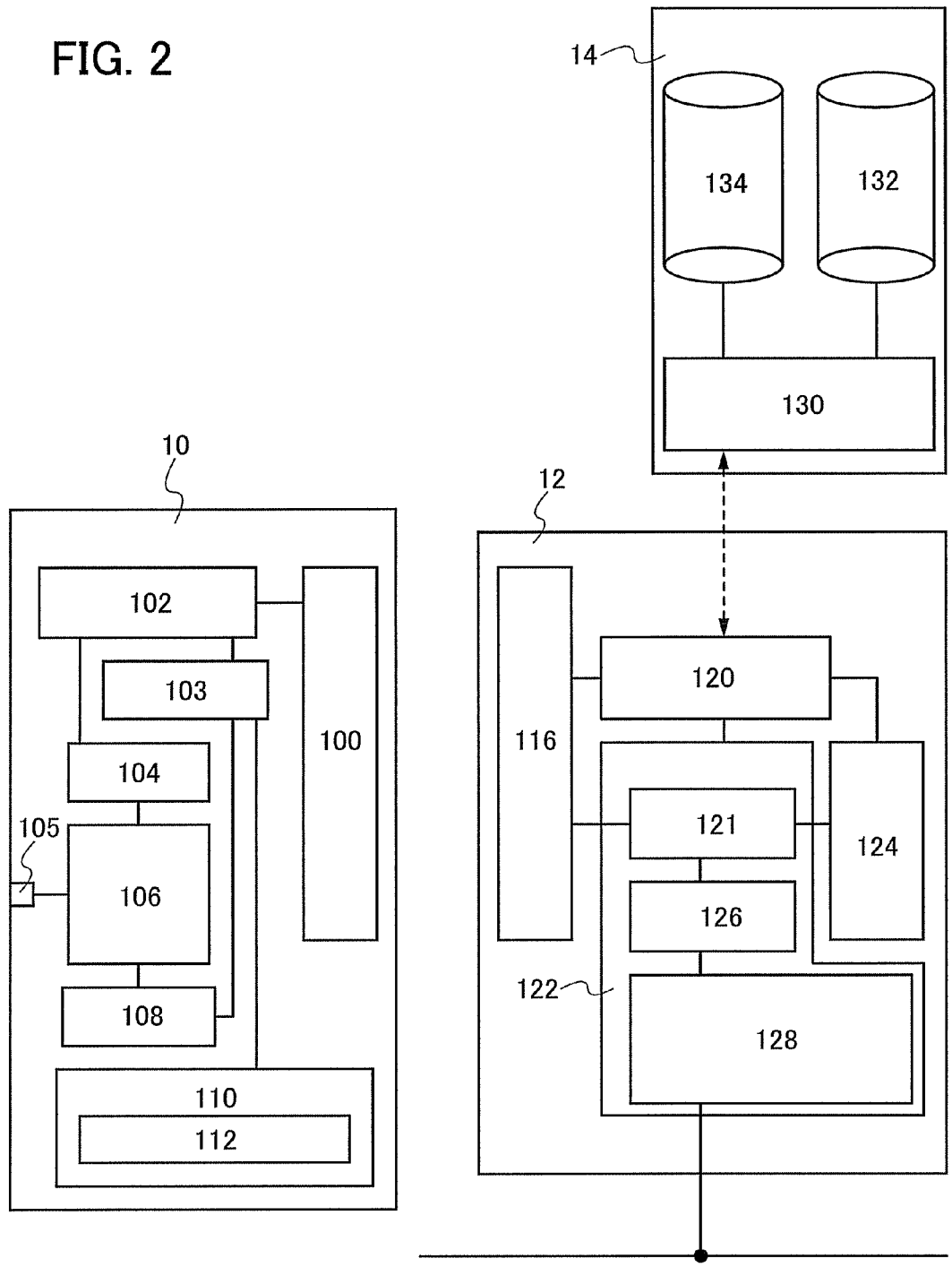
FIG. 2 is a diagram showing a structure of a wireless power supply system according to Embodiment Mode 2.

The wireless power supply system of the present invention includes a power storage device which can be charged without contact, a terminal device which supplies electric power to the power storage device, and a management server which manages electric power that is supplied to the power storage device. FIG. 2 shows one structural example of the wireless power supply system.

The power storage device 10 has a power storage portion 106 which stores electric power. The power storage portion 106 stores electric power obtained by rectification by a charging portion 104 of electric waves received by an antenna 100. The power storage portion 106 is preferably formed using a capacitor such as an electric double layer capacitor or a ceramic capacitor. Because a capacitor can store electric power without chemical reaction, unlike a lead battery or a lithium-ion battery (secondary battery), it has advantages of a short charging time and no deterioration due to repetitive charging and discharging. In addition, reductions in size and weight can be achieved.

The antenna 100 of the power storage device 10 receives a control signal and a power signal which are transmitted from the terminal charging device 12. The control signal received by the antenna 100 is input to a power storage device communication portion 102. The power storage device communication portion 102 outputs the control signal to a signal control portion 103. The power signal received by the antenna 100 is input to the power storage device communication portion 102, and the power signal is then output to the charging portion 104.

In the case where the terminal charging device 12 transmits a control signal or a power signal, by transmission of identification signals before and after a carrier wave of the signal, the power storage device communication portion 102 can easily distinguish the signal from another. As another method for easy distinction of the signal, a modulated wave obtained by superimposing a control signal on a power signal may be used. As another method, the frequency band of a control signal and that of a power signal may be made to be different from each other.

In any case, the power storage device 10 and the terminal charging device 12 operate to transmit and receive signals to and from each other by wireless communication. Types of control signals transmitted from the terminal charging device 12 include an instruction to read identification information stored in the memory portion 110, an instruction to make a response about necessity for charging, and the like.

The power storage device communication portion 102 functions to demodulate the control signal transmitted from the terminal charging device 12 and to modulate the control signal to be transmitted from the power storage device 10 to the terminal charging device 12. Of the signals, the demodulated control signal is output to the signal control portion 103. The signal control portion 103 controls a reading or writing operation of the memory portion 110 based on the control signal. In addition, an output of a voltage detection portion 108 which manages the voltage of the power storage portion 106 is input to the signal control portion 103, which generates a signal for making a response about the necessity for charging of the power storage device 10 such as determination of the necessity for charging.

The terminal charging device 12 transmits the power signal for charging the power storage device 10. When the power signal is received by the antenna 100 of the power storage device 10, it is transmitted to the charging portion 104 through the power storage device communication portion 102. The charging portion 104 rectifies the power signal and charges the power storage portion 106 with electric power. Because the power signal is an AC signal, the charging portion 104 provides half-wave rectification or full-wave rectification of the power signal to generate DC power. The electric power stored in the power storage portion 106 can be used by connection of a load to an output terminal 105.

The amount of electric power stored in the power storage portion 106 is managed using the voltage detection portion 108. The voltage detection portion 108 detects the voltage of the power storage portion 106 and manages a charging state by the voltage. The voltage detected by the voltage detection portion 108 is output to the signal control portion 103. The signal control portion 103 outputs a charge request signal to the power storage device communication portion 102 when the voltage is less than or equal to a specified value. When the voltage is greater than or equal to the specified value, the signal control portion 103 outputs a charge stop signal to the power storage device communication portion 102. The signal for making a response about the necessity for charging of the power storage device 10 is generated by detection of the amount of voltage of the power storage portion 106, and charging power is managed by such a method.

The terminal charging device 12 cooperates with the management server 14 to control electric power supplied to the power storage device 10. The terminal charging device 12 and the management server 14 are connected to each other by a wired or wireless communication line. An identification signal, a charge enable signal, usage information, and the like are communicated between a terminal communication portion 120 of the terminal charging device 12 and a server communication portion 130 of the management server 14.

The terminal communication portion 120 communicates with the power storage device 10 through an antenna 116. The terminal communication portion 120 transmits an identification information request signal, a charge necessity confirming signal, or the like to the power storage device 10. In addition, it receives an identification signal, a charge request signal, and a charge non-request signal which are transmitted from the power storage device 10.

The terminal communication portion 120 of the terminal charging device 12 outputs a signal to operate a power signal transmission portion 122 when it receives a charge enable signal from the management server 14. The power signal transmission portion 122 generates a power signal by obtaining electric power from a power supply portion 128 and modulating an output of an oscillation portion 126, which oscillates at a predetermined frequency, by a modulation portion 121. The power signal is output to the power storage device 10 using the antenna 116. In the power signal transmission portion 122, information about charge initiation and termination or signals by which the power storage device 10 recognizes the power signal can be communicated before and after the power signal by modulation of the power signal. With the use of that signal, the operation of the charging portion 104 of the power storage device 10 can also be controlled. Note that although FIG. 2 shows a structure in which the antenna 116 is used to transmit both the control signal and the power signal, the wireless power supply system may have a structure in which the control signal and the power signal are transmitted by separate antennas.

One example of the power signal transmitted by the power signal transmission portion 122 is a power signal which is obtained by modulating an AC signal into a rectangular pulse signal. When a rectangular pulse signal is output for a certain period of time as the power signal transmitted by the power signal transmission portion 122, a measuring portion 124 counts the number of pulses to measure the amount of power supplied to the power storage device 10. Even in the case where pulse modulation is not performed, power signals are transmitted intermittently and the measuring portion 124 measures the number of times the power signals are transmitted. By thus measuring the power signal output from the power signal transmission portion 122 by the measuring portion 124, the amount of power supplied to the power storage device 10 can be known.

The measured value of the measuring portion 124 is transmitted to the terminal communication portion 120 after charging is terminated. The measured value is further transmitted to the management server 14 and is stored in a second storage medium 134 as usage information. In addition, it may be possible to charge a user based on the usage information. The usage information obtained by the management server 14 may be transmitted to the power storage device 10. Accordingly, the user of the power storage device 10 can know his or her own usage information.

As described above, the wireless power supply system according to this embodiment mode supplies electric power to the power storage device 10 through cooperation of the terminal charging device 12 and the management server 14.

Figure 3:
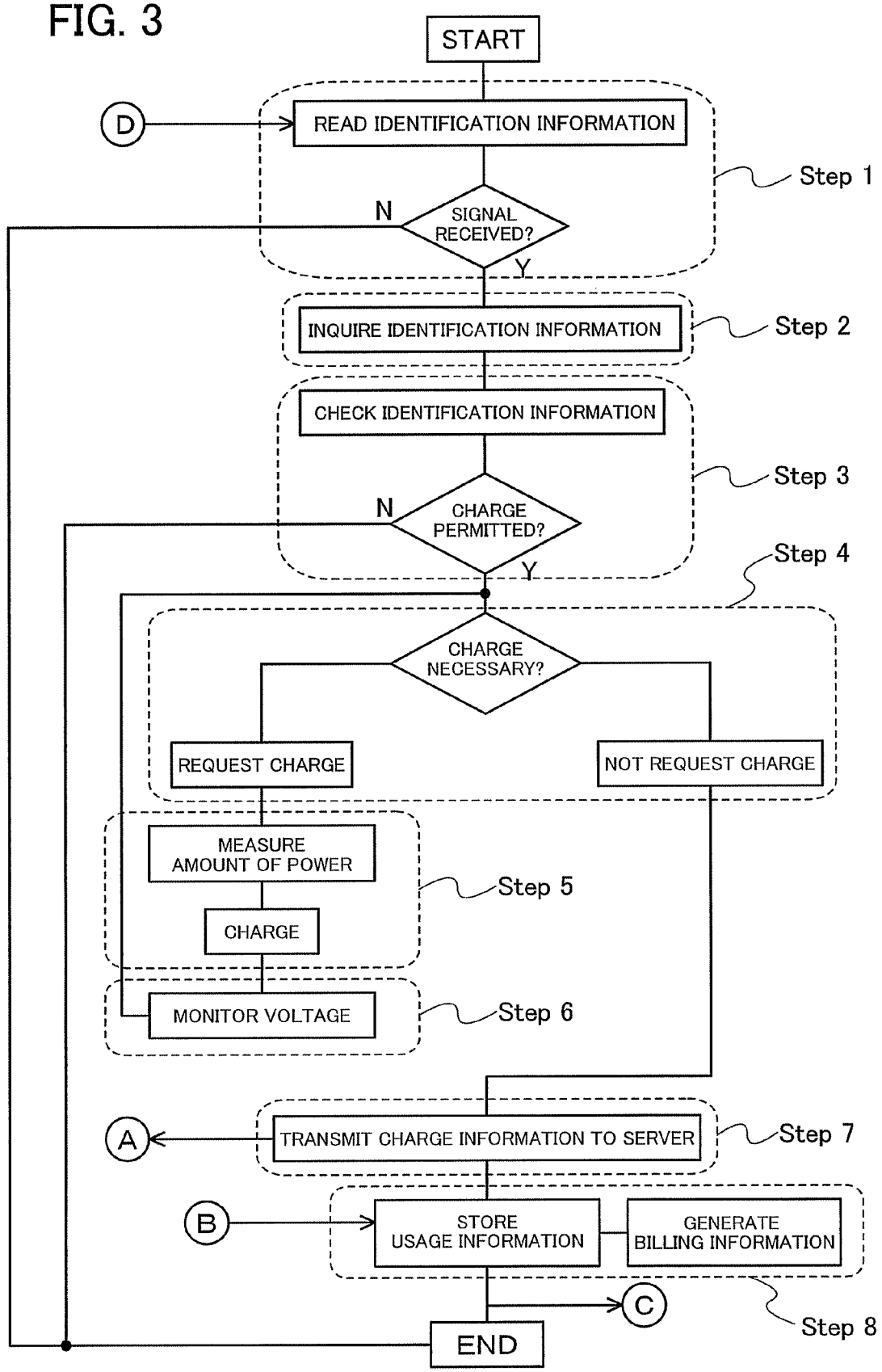
FIG. 3 is a flow chart showing an operation of the wireless power supply system according to Embodiment Mode 2.

FIG. 3 shows a flow chart illustrating an operation of the wireless power supply system. Hereinafter, an explanation is made based on the wireless power supply system of FIG. 2, and reference will be made to both of the diagrams.

When the terminal charging device 12 receives charge requests from unspecified users, it is necessary to determine whether they are registered in advance as users and permitted to charge power storage devices. In other words, it is necessary to determine whether the power storage device 10 to be charged by the terminal charging device 12 is that owned by a user who is permitted to charge a power storage device.

This determination is made based on identification information allocated to each user. Although the identification information may be input to the terminal charging device by a user with the use of an input medium, it is preferably recognized automatically in order to improve convenience. The automatic recognition is preferably performed by a method in which the identification information is stored in the power storage device 10 and recognized by communication between the power storage device 10 and the terminal charging device 12. In that case, the memory portion 110 of the power storage device 10 is provided with an identification information storage portion 112, where the identification information is stored.

In order for a user to obtain electric power in the wireless power supply system according to this embodiment mode, a plurality of steps need to be performed. Each step is described below with reference to FIG. 3.

(Step 1)

First, the terminal charging device 12 operates to read the identification information stored in the identification information storage portion 112 in the memory portion 110 of the power storage device 10. The identification information stored in the identification information storage portion 112 is transmitted from the power storage device communication portion 102 of the power storage device 10 to the terminal communication portion 120 of the terminal charging device 12 by request from the terminal charging device 12. When the power storage device 10 does not respond to the request from the terminal charging device 12 or the identification information is not communicated, it is determined that there is no signal, and the operation is terminated. When the terminal communication portion 120 receives the identification information, the process proceeds to the next step.

(Step 2)

The terminal charging device 12 communicates with the management server 14 to determine whether the identification information obtained is authentic or not, or valid or not. The terminal charging device 12 makes an inquiry of the identification information obtained to the management server 14. The inquiry of the identification information is performed by transmission of the identification information from the terminal communication portion 120 to the server communication portion 130 of the management server 14.

(Step 3)

The management server 14 determines whether the identification information transmitted from the terminal charging device 12 is acceptable or not with reference to a first storage medium 132 of the management server 14. In the first storage medium 132, identification information of users is registered. The management server 14 checks the identification information stored in the first storage medium 132 against the identification information transmitted from the terminal charging device 12 to determine whether to permit charging or not. Accordingly, when the management server 14 does not permit charging, it transmits a charge disable signal to the terminal charging device 12. The terminal charging device 12 which has received the charge disable signal terminates the charging operation. When the identification information is registered as authentic, a charge enable signal is transmitted to the terminal charging device 12, and the process proceeds to the next step.

(Step 4)

The terminal charging device 12 which has received the charge enable signal transmits a signal for confirming the necessity of charging to the power storage device 10. This is in order to prevent an unnecessary amount of power that exceeds the capacity of the power storage portion 106 from being supplied because the allowed charging amount of the power storage device 10 depends on the capacitance of the power storage portion 106. In other words, because the charging is to be managed by the power storage device 10, an operation confirming whether the power storage device 10 needs to be charged or not becomes necessary. The power storage device 10 which has received a charge necessity confirming signal responds with a charge request signal when requesting charging or a charge non-request signal when not requesting charging. When charging is performed, the process proceeds to Step 5, and when charging is not necessary, the process proceeds to Step 7.

(Step 5)

When the terminal charging device 12 receives a charge request, charging is initiated. Charging is performed with a plurality of power signals. Charging is performed through a plurality of steps in order to prevent overcharging. Before the terminal charging device 12 transmits a power signal, at the same time that it transmits a power signal, or after it transmits a power signal, the measuring portion 124 is made to operate to measure the amount of electric power transmitted. The power signal may be counted as described above by counting the number of pulses of a pulse-modulated power signal by the measuring portion. The amount of electric power supplied to the power storage device 10 can be known based on the number of pulses counted. Transmission of the power signal continues for a certain period of time and is then terminated. The length of time it takes to transmit each power signal is set so that the power storage portion 106 of the power storage device 10 is not fully charged with a single power signal.

(Step 6)

In the power storage device 10 after the power signal has been received, the voltage detection portion 108 operates to monitor the amount of voltage of the power storage portion 106. When the amount of voltage of the power storage portion 106 is less than or equal to a predetermined value, the voltage detection portion 108 transmits a signal to the signal control portion 103 of the power storage device 10 so that a charge request signal can be transmitted when a charge necessity confirming signal is received next. Alternatively, when the amount of charging voltage is sufficient, it transmits a signal to the signal control portion 103 so as to transmit a charge non-request signal. Then, the process returns to Step 4. Note that the series of operations from Step 4 to Step 6 is performed once or multiple number of times depending on the amount of charge needed.

(Step 7)

The terminal charging device 12 which has received the charge non-request signal from the power storage device 10 in step 4 terminates the transmission of the power signal. Then, it transmits charge information measured by the measuring portion 124 from the terminal communication portion 120 to the management server 14.

(Step 8)

The management server 14 to which the charge information has been transmitted performs processing for storing the charge information. The charge information is stored in the second storage medium 134. Generation of billing information is performed based on the information stored in the second storage medium 134.

Figure 4:
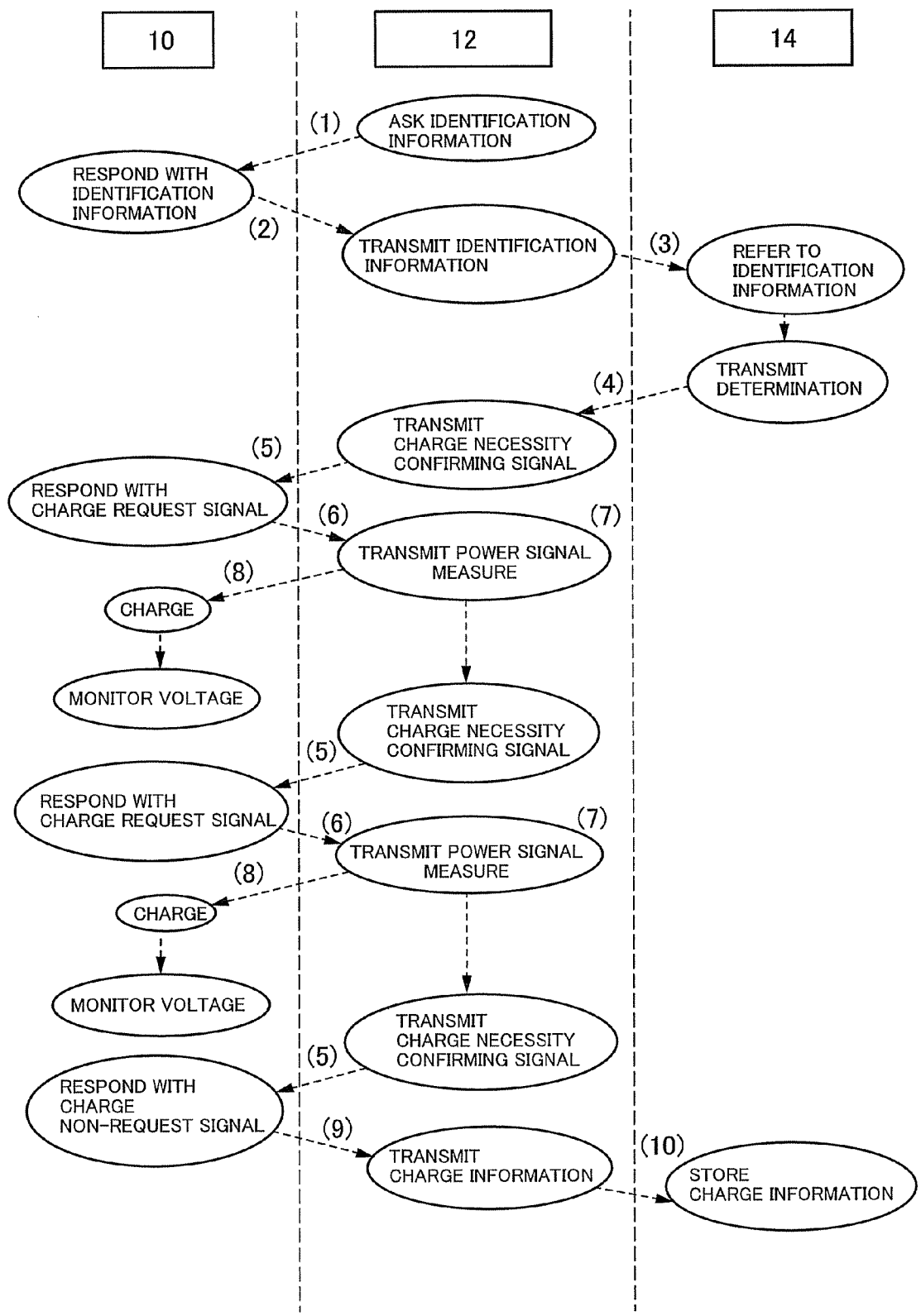
FIG. 4 is a diagram showing an operation of the wireless power supply system according to Embodiment Mode 2.
Figure 5:
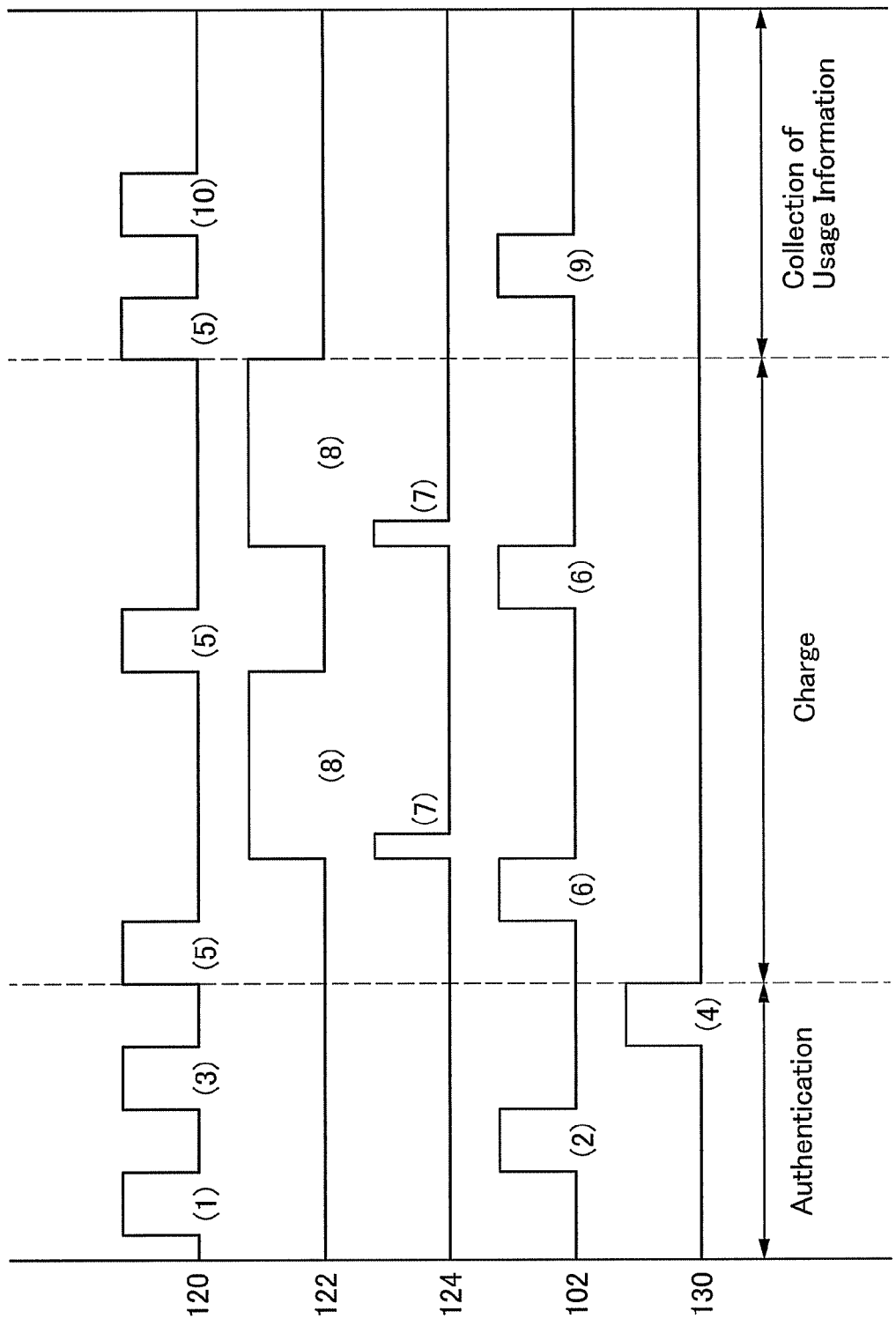
FIG. 5 is a diagram showing an operation of the wireless power supply system according to Embodiment Mode 2.

Next, the operations shown in FIG. 3 are described with reference to FIGS. 4 and 5. FIG. 4 illustrates transmission of information between the power storage device 10, the terminal charging device 12, and the management server 14 and operations thereof. FIG. 5 shows timing thereof.

(1) A charging operation starts when the terminal charging device 12 recognizes the power storage device 10. The terminal charging device 12 transmits an instruction to read identification information to the power storage device 10.

(2) The power storage device 10 operates based on the instruction, and transmits the identification information stored in the identification information storage portion 112 of the memory portion 110 to the terminal charging device 12.

(3) The terminal charging device 12 transmits the identification information transmitted from the power storage device 10 to the management server 14 to inquire whether the identification information is that of an authentic user or not.

(4) The management server 14 checks to see whether the identification information in question is that of a registered user or not with reference to data stored in the first storage medium 132 and transmits the result to the terminal charging device 12.

(5) The terminal charging device 12 which has received charge permission transmits a control signal for inquiring the necessity for charging of the power storage device 10.

(6) When the power storage device 10 requests charging, it responds to the terminal charging device 12 with a charge request signal.

(7) and (8) The terminal charging device 12 which has received the charge request from the power storage device 10 transmits a power signal. In addition, before, after, or at the same time that the power signal is transmitted, the measuring portion is made to operate to store the transmission amount of the power signal.

The transmission of the power signal from the terminal charging device 12 to the power storage device 10 continues for a certain period. A charging operation of the power storage device 10 is performed with a plurality of power signals. Before, after, or at the same time that the power signal is transmitted from the terminal charging device 12, the measuring portion 124 is made to operate to record charge information. In addition, the number of pulses included in the pulse-modulated power signal may be counted by the measuring portion 124.

(5) After the transmission of the power signal is terminated, the terminal charging device 12 transmits a charge necessity confirming signal to the power storage device 10.

(6) When the power storage device 10 requests charging, it responds to the terminal charging device 12 with a charge request signal. The terminal charging device 12 which has received the charge request from the power storage device 10 transmits a power signal.

(7) and (8) In addition, before, after, or at the same time that the power signal is transmitted, the measuring portion 124 is made to operate to record the transmission amount of the power signal.

In this manner, operations from (5) to (8) are repeated to provide the power storage device 10 with a predetermined amount of power.

(9) The power storage device 10 which has received the charge necessity confirming signal from the terminal charging device 12 transmits a charge non-request signal when charging is unnecessary.

(10) The terminal charging device 12 which has received the charge non-request signal transmits information about the amount of electric power that is transmitted to the power storage device 10 to the management server 14.

The management server 14 stores the usage information in the second storage medium 134. It can also generate billing information based on the stored information.

As described above, the power storage device 10 is supplied with electric power. By cooperation of the power storage device 10, the terminal charging device 12, and the management server 14, cordless charging can be performed, and convenience for users is improved. A manager can specify a user and provide a service for charging a power storage device of the specified user. In this case, because an identification number is stored in the power storage device and registered in the management server in advance, a user does not need to perform troublesome operation in charging. The user can use the stored electric power by connection of a load to the power storage device.

Embodiment Mode 3

A structure for notifying a user of a power storage device of usage information in Embodiment Mode 1 is described. Note that similar components to those in Embodiment Mode 1 are denoted by the same reference numerals, and description of the components is omitted unless particularly needed.

Figure 6:
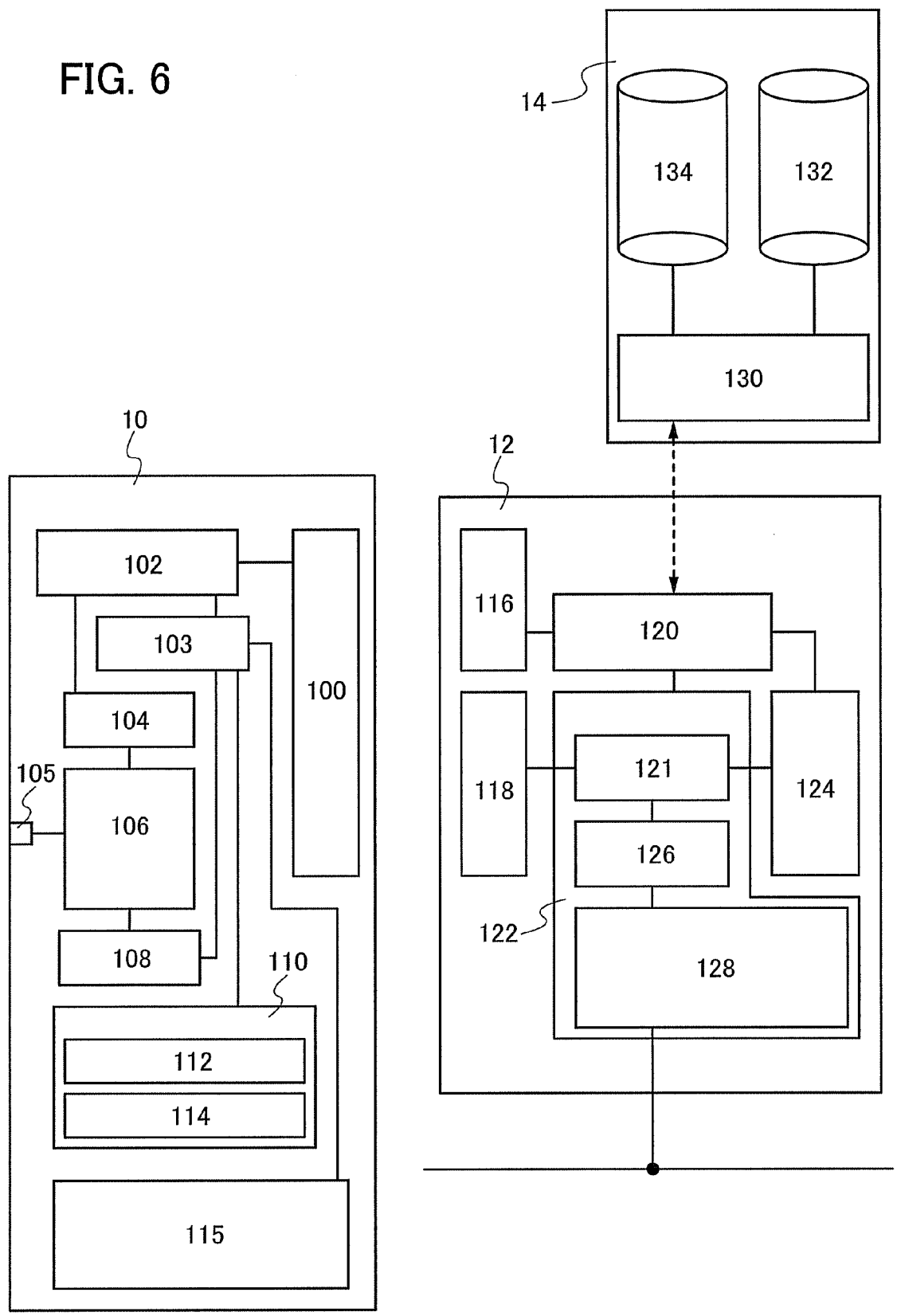
FIG. 6 is a diagram showing a structure of a wireless power supply system according to Embodiment Mode 3.

FIG. 6 shows a structural example of a wireless power supply system according to this embodiment mode. A main change from FIG. 2 is that the power storage device 10 is provided with a display portion 115. In addition, the memory portion 110 is provided with a usage information storage portion 114 so that a user can see usage information.

The display portion 115 of the power storage device 10 can be a liquid crystal panel, an electrochromic panel, an electroluminescent panel, a display panel using a contrast medium such as electronic ink, or the like. Note that the contrast medium refers to a medium in which an electrophoretic dispersed liquid is encapsulate in a microcapsule and which changes a hue or a contrast by application of a voltage. A display panel that uses the contrast medium has a feature of very low power consumption.

The display portion 115 is connected to the signal control portion 103 and provided to display an operation menu screen, the amount of stored power remaining in the power storage portion 106, the amount of power used, and the like. By provision of the power storage device 10 with the display portion 115, the user can see such information as described above.

Figure 7:
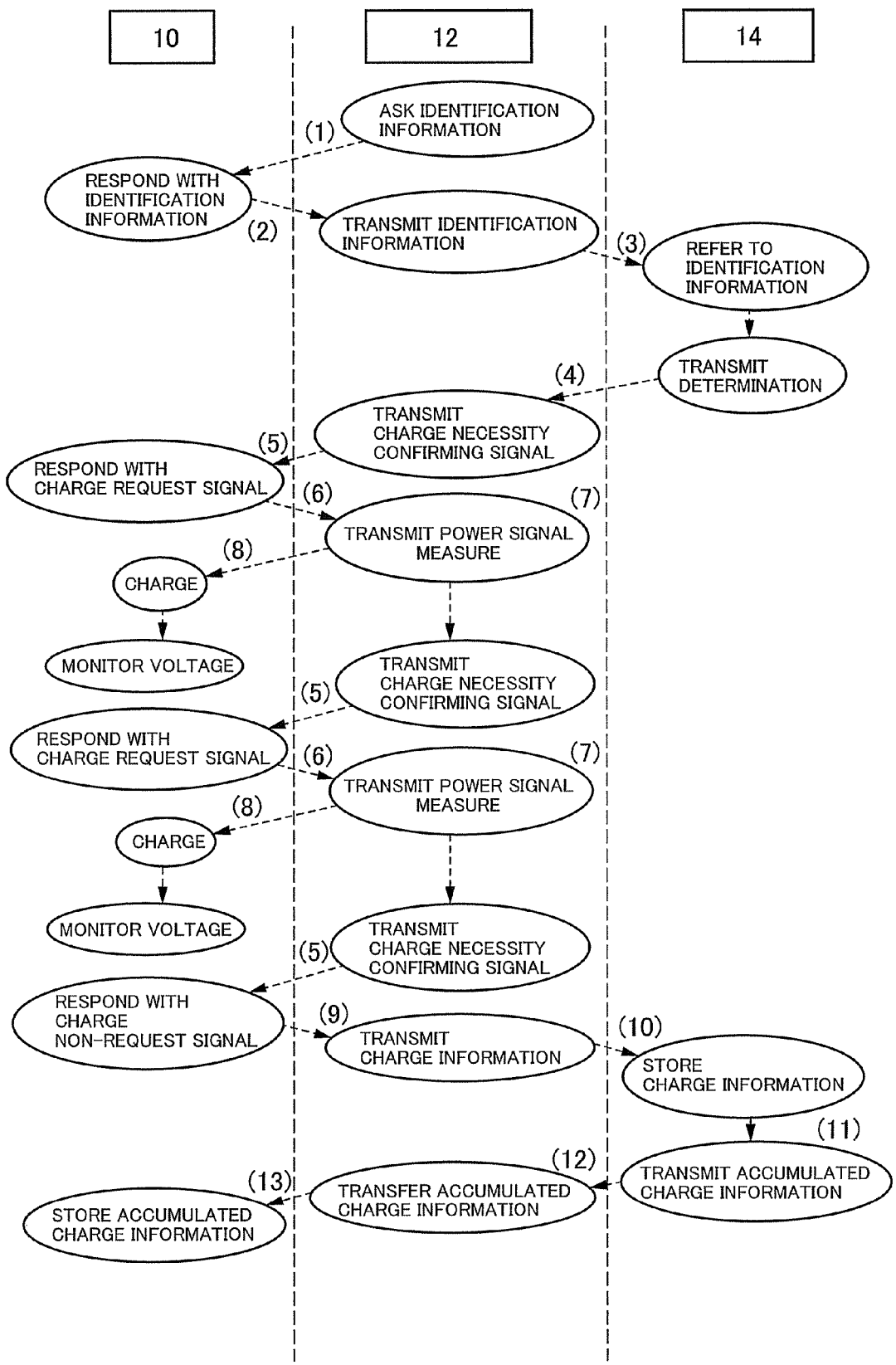
FIG. 7 is a diagram showing an operation of the wireless power supply system according to Embodiment Mode 3.
Figure 8:
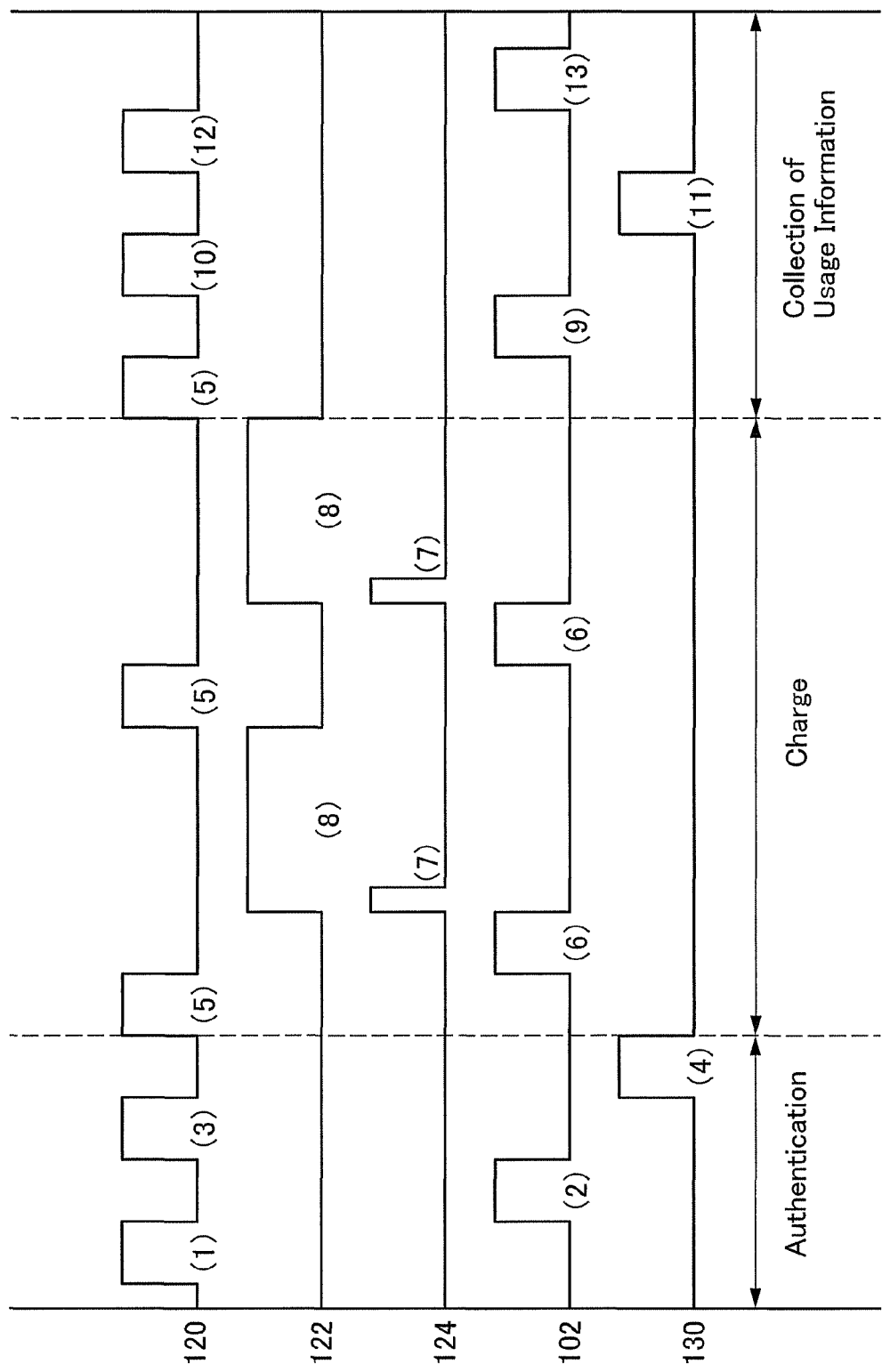
FIG. 8 is a diagram showing an operation of the wireless power supply system according to Embodiment Mode 3.

Next, the operation of such a wireless power supply system is described with reference to FIGS. 7 and 8. FIG. 7 illustrates the transmission of information between the power storage device 10, the terminal charging device 12, and the management server 14 and operations thereof. FIG. 8 shows timing thereof. Note that the operations (1) to (10) are similar to those in Embodiment Mode 1, so that description thereof is omitted.

The management server 14 which has received the charge information transmitted from the terminal charging device 12 stores the usage information in the second storage medium 134. It can also generate billing information based on the usage information.

(11) In order to notify a user of this information, the usage information, the billing information, and the like is transmitted as accumulated charge information to the terminal charging device 12. The content of the usage information or the like may be transmitted every time usage is generated, usage information for a certain period may be collectively transmitted, or cumulative usage information for a certain period may be transmitted, any of which may be selected as appropriate.

(12) The terminal charging device 12 transmits the usage information and the billing information that is transmitted as the accumulated charge information from the management server 14 to the power storage device 10.

(13) The power storage device 10 receives the information.

The information received is stored in the usage information storage portion 114 of the memory portion 110. The usage information stored in the usage information storage portion 114 can be displayed on the display portion 115 so that it can be seen by the user.

As described above, the power storage device 10 can be supplied with electric power; in addition, a user can know the usage information such as the amount of power, the date and time of usage, or the like of the supply from the terminal charging device 12, the billing information, and the like. Accordingly, convenience for a user can be increased. A manager can provide a service for encouraging a user in usage of this system or alerting a user so that the user does not receive the supply of an excessive amount of electric power.

Embodiment Mode 4

An information distribution system which is structured using the wireless power supply system according to the present invention is described with reference to FIG. 9. Note that similar components to those in Embodiment Mode 1 or 3 are denoted by the same reference numerals, and description of the components is omitted unless particularly needed.

Figure 9:
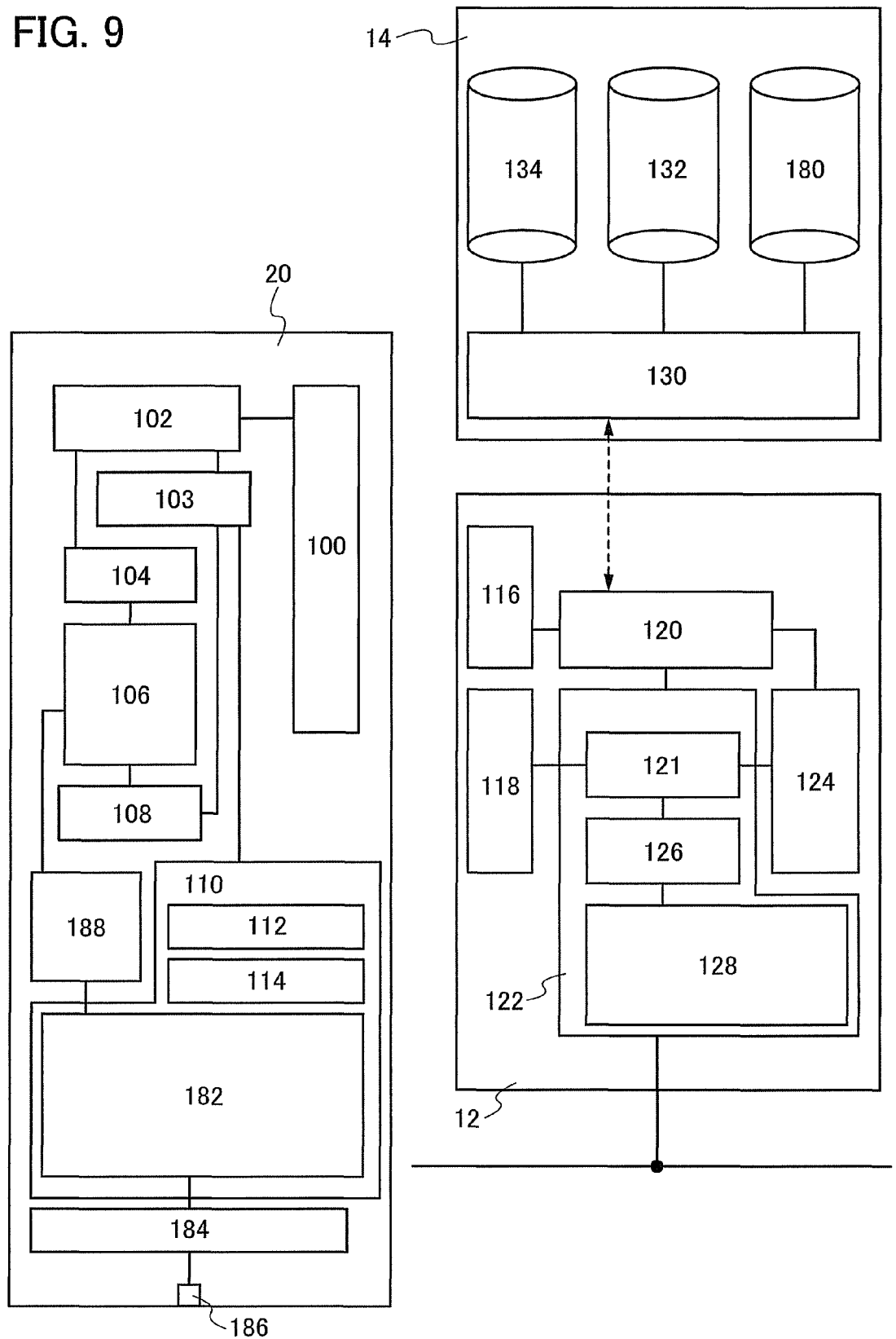
FIG. 9 is a diagram showing a structure of a wireless power supply system according to Embodiment Mode 4.

FIG. 9 shows a structural example of a wireless power supply system according to this embodiment mode. The management server 14 has a third storage medium 180, which stores information to be provided for users, in addition to the server communication portion 130, the first storage medium 132 which stores user identification information, and the second storage medium 134 which stores usage information. The information to be provided for users includes entertainment information for users, such as music information, image information, movie information, or computer program information, and information useful for users, such as maps or route information. The terminal charging device 12 has a similar structure to that of Embodiment Mode 3. The terminal communication portion 120 communicates with the server communication portion 130 of the management server 14 and controls the operation of the power signal transmission portion 122.

A memory card 20 with a power storage device has the memory portion 110 including the identification information storage portion 112, the usage information storage portion 114, and a storage portion 182 of the information provided for a user; the antenna 100 which receives electric waves transmitted from the terminal charging device; and the power storage portion 106 which stores the electric waves received by the antenna 100 as electric power and supplies the electric power for memory retainment to the memory portion 110. The storage portion 182 of the provided information stores the information transmitted from the information to be provided for users which is stored in the third storage medium 180 of the management server 14.

The storage portion 182 of the provided information includes a volatile memory. The volatile memory includes a dynamic RAM, a static RAM, or the like. The memory card 20 with a power storage device retains information stored in the storage portion 182 of the provided information for a certain period. Therefore, electric power necessary for the volatile memory to retain information is supplied from a memory power supply circuit 188 using the power storage portion 106. The volatile memory retains information while electric power is supplied from the memory power supply circuit 188.

The information stored in the memory portion 182 of the provided information can be used by connection of the memory card 20 with a power storage device to an external device such as a reproducer. An output terminal 186 is a terminal that is to be connected to an external device, and the information of the storage portion 182 of the provided information is output through an output interface 184.

The memory card 20 with a power storage device can store the information of the storage portion 182 of the provided information in the memory portion 110 while electric power is stored in the power storage portion 106. For example, when the information to be provided for users is provided from the management server 14 to the memory card 20 with a power storage device, a certain amount of electric power is supplied from the terminal charging device 12. When a user desires to extend the length of time the provided information is available, the user transmits a request to the terminal charging device 12 so that electric power is supplied to the memory card 20 with a power storage device. At this time, the terminal charging device 12 and the management server 14 may cooperate with each other to charge a bill for the extension of the period during which information is available.

Next, a method for distributing information, of which the period during which it is effective is limited, by using the wireless power supply system according to this embodiment mode is described.

Figure 10:
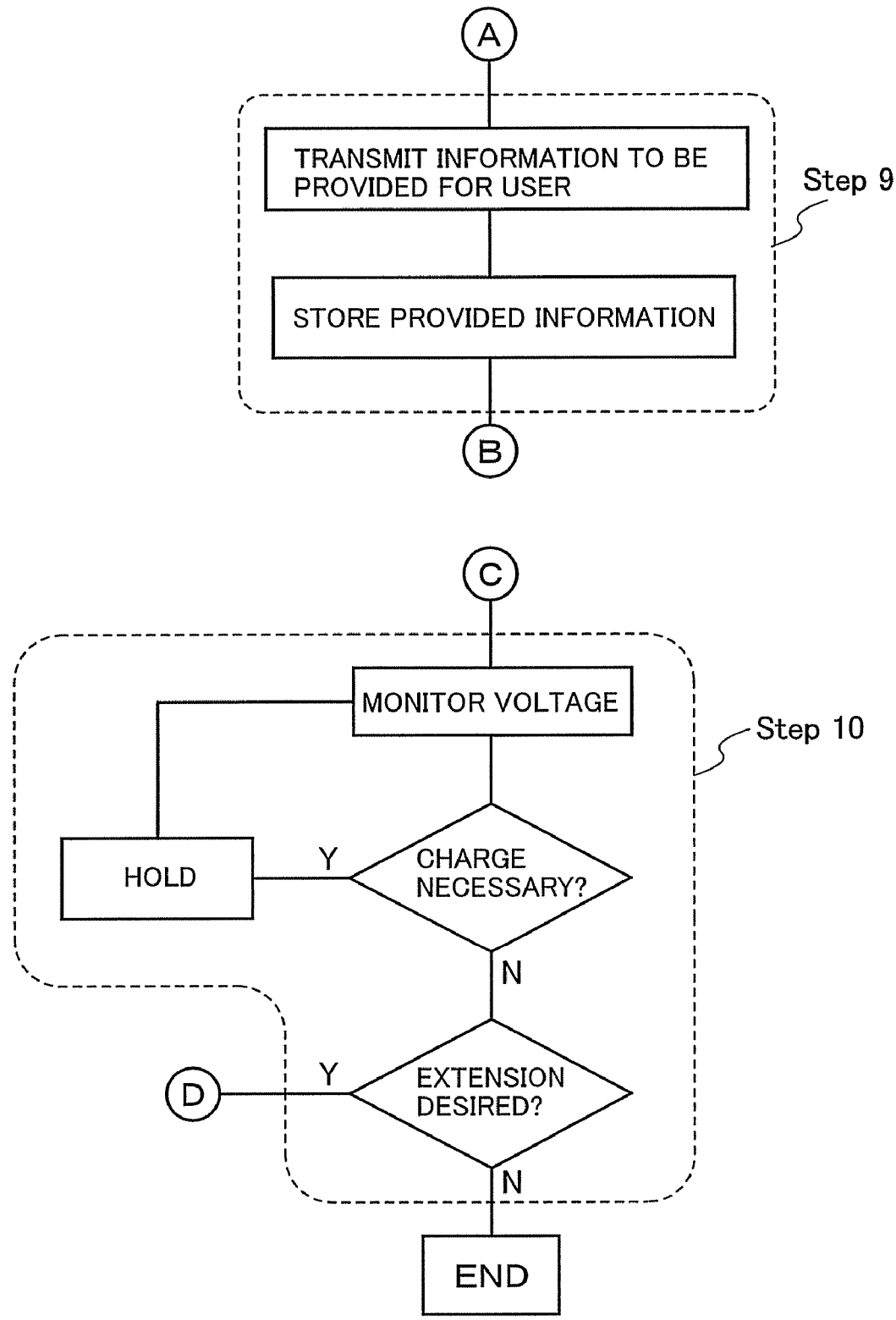
FIG. 10 is a flow chart showing an operation of the wireless power supply system according to Embodiment Mode 4.

A user who desires to obtain the information to be provided for users performs a procedure for receiving a supply of power from the terminal charging device 12 in order to charge the memory card 20 with a power storage device. This procedure is similar to Step 1 to Step 7 illustrated in FIG. 3, and description thereof is omitted. In other words, at a stage where the process proceeds up to Step 7 and charging of the power storage portion 106 is completed, a procedure for obtaining the information to be provided for users is performed. Hereinafter, the procedure is described with reference to FIG. 10.

(Step 9)

When the terminal charging device 12 notifies the management server 14 that charging is completed, the information to be provided for users is transmitted from the third storage medium 180 of the management server 14. The transmitted information to be provided for users is stored in the storage portion 182 of the provided information of the memory card 20 with a power storage device through the terminal charging device 12. The management server 14 operates to update the usage information in the second storage medium 134. In other words, the fact that a specific user has obtained the information to be provided for users is stored, or new billing information is generated.

(Step 10)

Because the storage portion 182 of the provided information of the memory card 20 with a power storage device includes a volatile memory, it requires continuous power supply from the power storage portion 106 to retain the information for a user. In this case, because the power of the power storage portion 106 decreases over time, the voltage detection portion 108 needs to periodically monitor the voltage of the power storage portion 106. In addition, when the voltage of the power storage portion 106 is decreased and it is determined that additional charging is necessary, a user determines whether retainment of the information for the user stored in the memory portion 182 of the provided information is desired or not. When the user desires to extend the length of time the information for the user is available, the process returns to Step 1 and a charging operation is initiated. Accordingly, the length of time the information for the user is available can be extended. When the user does not desire to extend the length of time the information for the user is available, the information for the user is lost when the power of the power storage portion 106 is used up.

In this manner, a provider of information for a user can provide a user with information only for a limited length of time. In addition, a user who desires extension can receive a supply of electric power for retaining the information for the user stored in the storage portion 182 of the information provided for the user to the memory card 20 with a power storage device and can be charged for the extension.

Figure 11A:
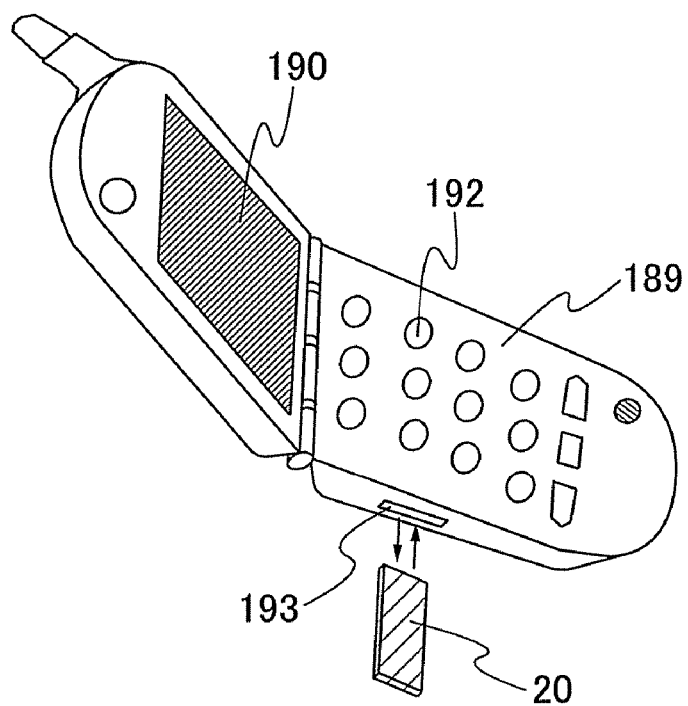
FIGS. 11A and 11B are diagrams each showing an example of an application of a memory card with a power storage device.
Figure 11B:
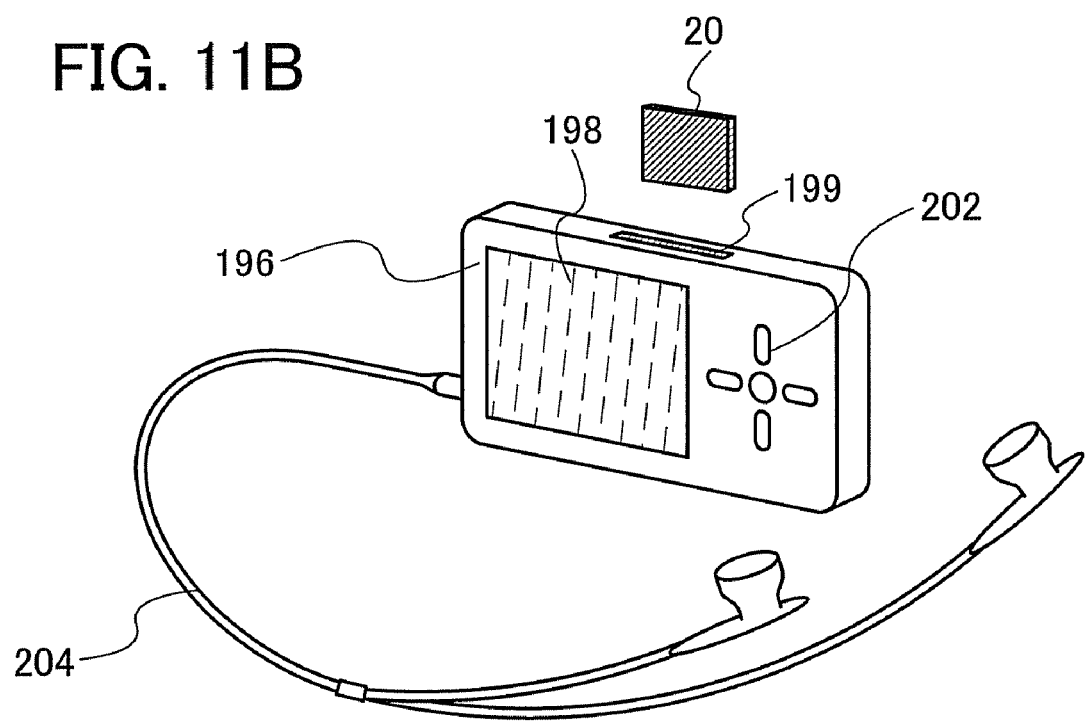

FIGS. 11A and 11B show examples of application of the memory card 20 with a power storage device. FIG. 11A shows a cellular phone, which is a typical example of a portable electronic device. This cellular phone has a chassis 189, a display portion 190, an operation key 192, and the like. The cellular phone has a memory card slot 193, and by insertion of the memory card 20 with a power storage device into the memory card slot 193, information stored in the memory portion where the memory is retained by the power storage device can be utilized. Such information includes data such as phone numbers, maps, images, and music data, and the like.

FIG. 11B shows a digital player, which is another typical example of a portable electronic device. The digital player shown in FIG. 11B has a chassis 196, a display portion 198, an operation portion 202, a receiver 204, and the like. The digital player has a memory card slot 199, and by insertion of the memory card 20 with a power storage device into the memory card slot 199, information stored in the memory portion where the memory is retained by the power storage device can be utilized. Such information includes images, music data, and the like.

In this manner, by use of a power storage device as a memory retaining power source of a volatile memory according to this embodiment mode, an information provider can manage information provided for a user so that the information is available for a certain period. Accordingly, copyright and the like can be protected, and use of a copyright can also be billed.

Embodiment Mode 5

Figure 12A:
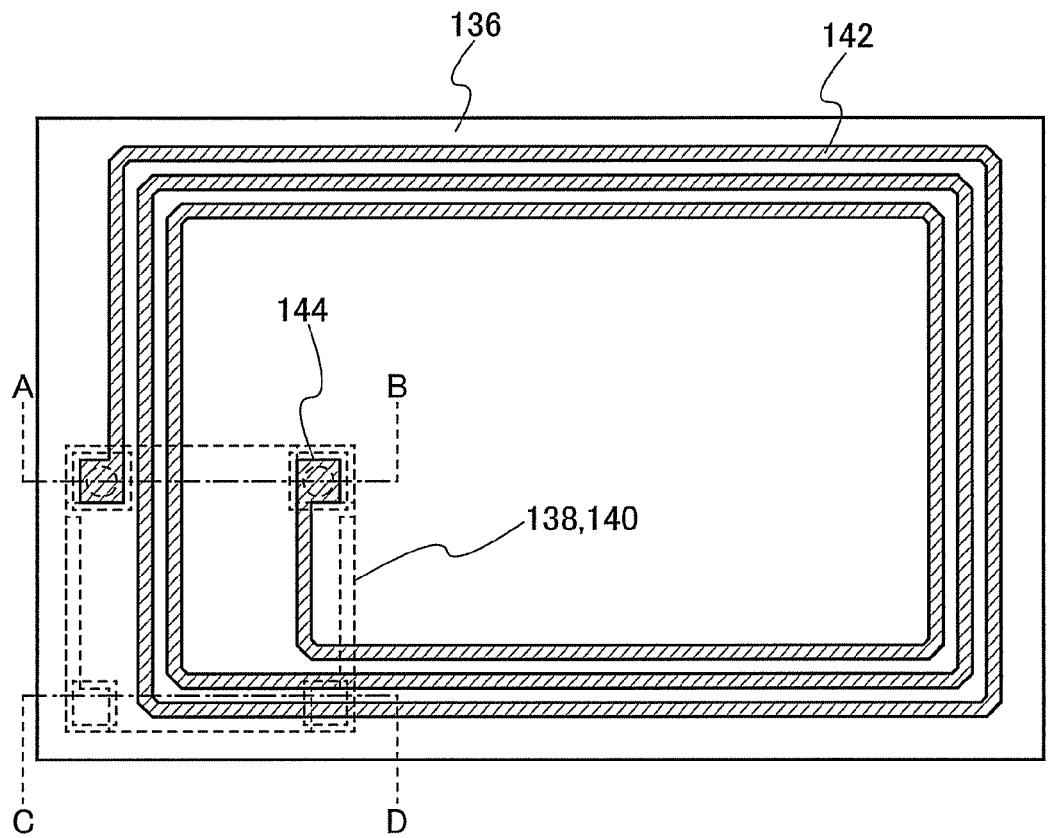
FIGS. 12A to 12C are plan views each showing a structure of a power storage device according to Embodiment Mode 5.
Figure 12B:
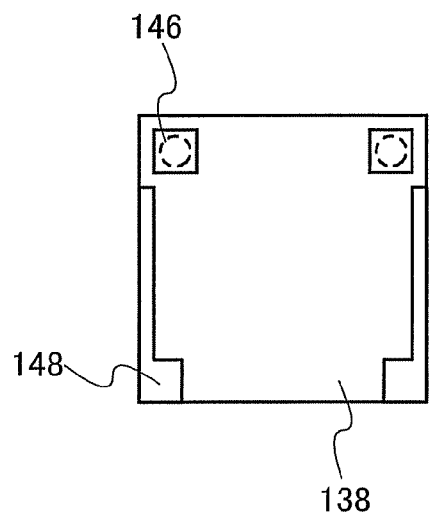
Figure 12C:
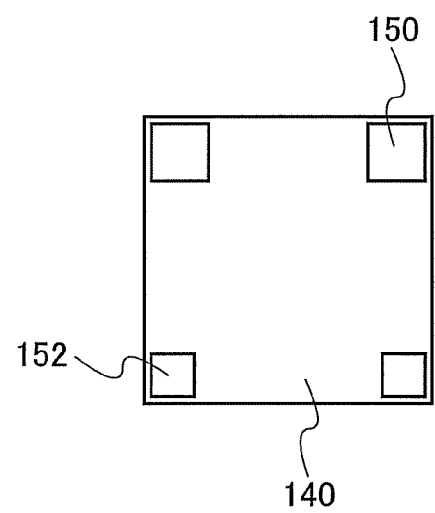
Figure 13A:
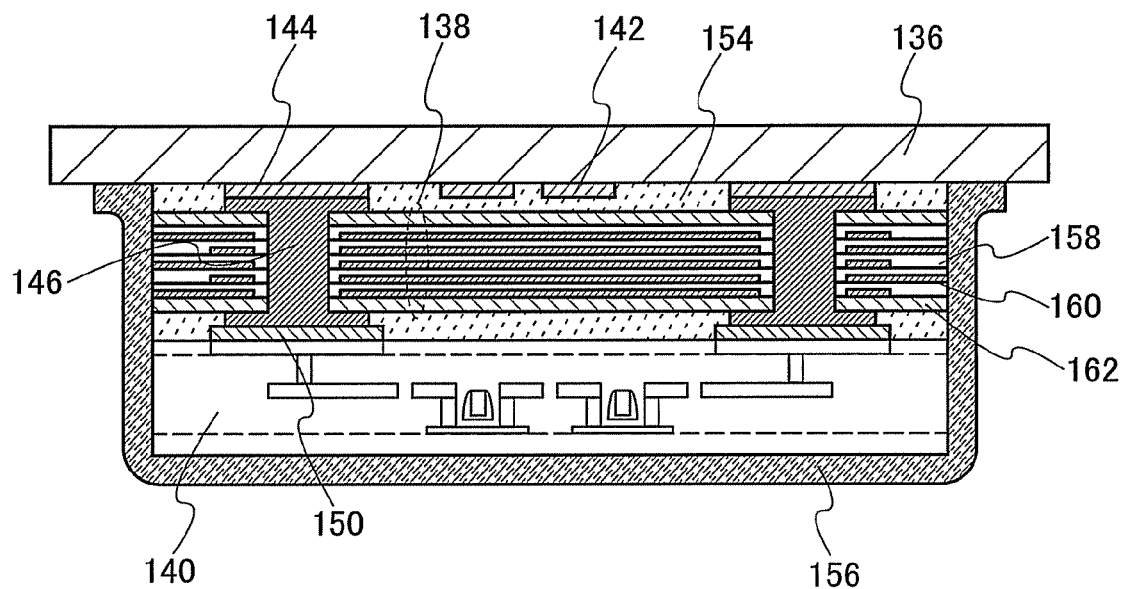
FIGS. 13A and 13B are cross-sectional views each showing a structure of the power storage device according to Embodiment Mode 5.
Figure 13B:
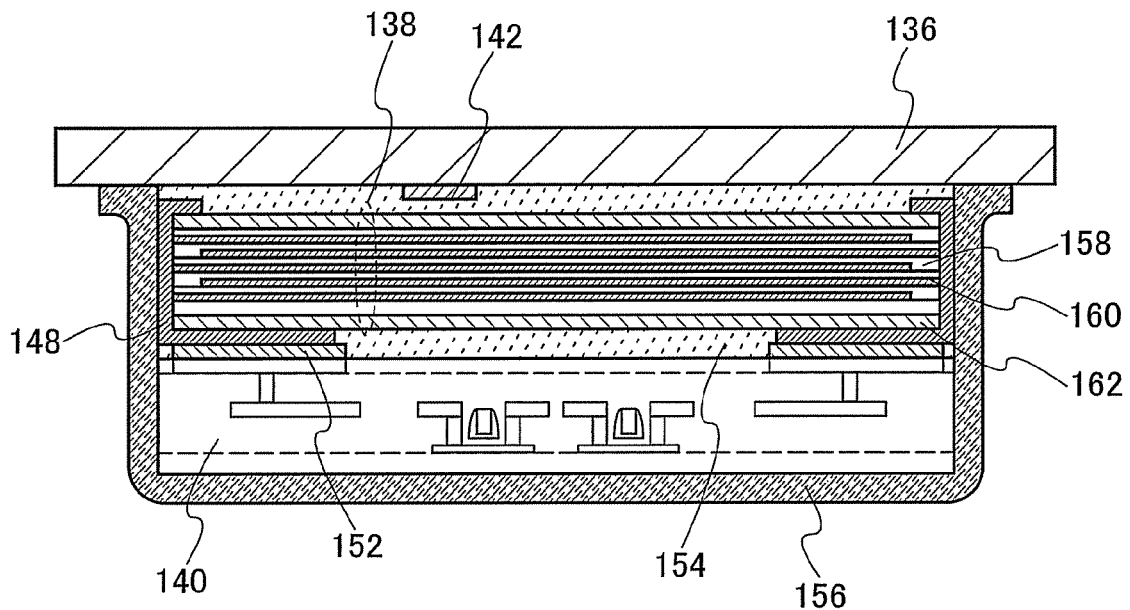

The power storage device according to the present invention has at least a memory portion which stores identification information, a power storage portion, and an antenna which receives a power carrier wave and a communication signal. An example of such a power storage device is described with reference to drawings. This embodiment mode describes an example of a power storage device combining a first structure 136 provided with an antenna, a second structure 138 provided with a power storage portion, and a third structure 140 provided with a circuit portion including a communication portion, a signal control portion, a charging portion, a memory portion, and the like (hereinafter referred to as a power storage device control circuit), with reference to FIGS. 12A to 13B. Note that FIGS. 12A to 12C are plan views of the power storage device. FIGS. 13A and 13B are cross-sectional views taken along a section line A-B and a section line C-D, respectively.

FIG. 12A shows the first structure 136 provided with an antenna 142. The first structure 136 is formed of an insulating material such as an insulating plate or an insulating film. An applicable material of the insulating plate or the insulating film is plastic such as PET (polyethylene terephthalate), PEN (polyethylene naphthalate), PES (polyether sulfone), polypropylene, polypropylene sulfide, polycarbonate, polyetherimide, polyphenylene sulfide, polyphenylene oxide, polysulfone, polyphthalamide, acrylic, or polyimide, glass, a nonwoven fabric, a paper material, or the like.

The antenna 142 is formed by a printing method, a plating method, or the like using a low-resistance metal material such as copper, silver, or aluminum. The antenna 142 is formed on either or both sides of the first structure 136. By forming the antenna 142 using both sides of the first structure 136, the length or area of the antenna can be increased, so that gain can also be increased. FIG. 12A shows the antenna 142 in a coil shape, which is suitable for the case of employing a magnetic field method. In the case of employing an electric field method (for example, a UHF band (860 to 960 MHz band), a 2.45 GHz band, or the like), the shape, such as the length, of a conductive layer functioning as an antenna may be appropriately set in consideration of the wavelength of an electromagnetic wave used for signal transmission. In this case, a monopole antenna, a dipole antenna, a patch antenna, or the like may be formed.

The second structure 138 and the third structure 140 are arranged in accordance with an antenna terminal 144 of the first structure 136. FIG. 12B is a plan view of the second structure 138, and FIG. 12C is a plan view of the third structure 140 provided with the power storage device control circuit. The second structure 138 and the third structure 140 provided with the power storage device control circuit preferably have approximately the same dimension. Alternatively, the third structure 140 provided with the power storage device control circuit may have a smaller dimension than the second structure 138. The third structure 140 provided with the power storage device control circuit has a power storage device communication portion, a signal control circuit, a charging circuit, a memory portion, and the like as shown in FIG. 2.

Next, the details of a connection structure of the second structure 138 and the third structure provided with the power storage device control circuit are described with reference to FIGS. 13A and 13B. FIG. 13A shows a cross-sectional view taken along a section line A-B. The first structure 136 and the third structure 140 provided with the power storage device control circuit are connected to each other by a through electrode 146 formed in the second structure 138. These are fixed by an adhesive 154. The second structure 138 is formed by stacking layers each including a dielectric layer 158 and a capacitor electrode 160 so as to be engaged with each other. The power storage portion is formed by thus stacking the dielectric layers 158 and the capacitor electrodes 160. In other words, the second structure 138 forms the power storage portion.

The through electrode 146 which penetrates the dielectric layers 158 is an electrode which connects the antenna terminal 144 and the third structure 140 provided with the power storage device control circuit. In the third structure 140 provided with the power storage device control circuit, a connection electrode 150 connected to the antenna terminal 144 and a capacitor portion connection electrode 152 connected to the capacitor electrode 160 are formed. A sealing material 156 is provided to cover the whole in order to protect the second structure 138 and the third structure 140 provided with the power storage device control circuit.

The dielectric layer 158 is formed by coating a substrate with a ceramic paste including a binder compound, a plasticizer, and an organic solvent in a ceramic material such as barium titanate ($BaTiO_3$), strontium titanate ($SrTiO_3$), or a lead-based perovskite compound material. Over that, an electrode paste selected from copper, a copper alloy, nickel, a nickel alloy, silver, a silver alloy, tin, and a tin alloy is printed to form the capacitor electrode 160. Note that when the through electrode 146 is formed, an opening is formed in a corresponding position. After these are dried, they are divided into a predetermined size, and a plurality of layers are stacked so that the capacitor electrodes 160 alternately engage with each other. This is sandwiched between protective layers 162 formed of a ceramic material and subjected to debindering, baking, and heat treatment; thus, the power storage portion is formed.

In FIGS. 13A and 13B, the dielectric layer 158 and the capacitor electrode 160 can each be formed with a thickness of 1 μm to 10 μm by using nano particles. Accordingly, a total thickness of five stacked dielectric layers 158 each having a thickness of 2 μm is 10 μm. In addition, even a total thickness of ten stacked dielectric layers 158 each having a thickness of 1 μm is 10 μm.

FIG. 13B shows a cross-sectional view taken along a section line C-D, which shows a structure of the capacitor electrode 160 and the capacitor portion connection electrode 152 of the third structure 140 provided with the power storage device control circuit. In the second structure 138, a capacitor external electrode 148 formed at the periphery is subjected to nickel plating, tin plating, or the like. A connection of the capacitor external electrode 148 and the capacitor portion connection electrode 152 can be achieved by the adhesive 154.

As described above, the power storage device combining the first structure 136 provided with the antenna, the second structure 138 provided with the power storage portion, and the third structure 140 provided with the power storage device control circuit is obtained. With the use of the second structure 138 formed of ceramic or the like, the rigidity of the power storage device can be increased. Accordingly, even when the power storage device having the third structure 140 provided with the power storage device control circuit is thinned, strength can be maintained and required function can also be maintained.

Next, an example of a power storage device having a plurality of antennas is described. An example of a power storage device combining the first structure 136 provided with the antenna, the second structure 138 provided with the power storage portion, the third structure 140 provided with the power storage device control circuit, and a ceramic antenna 164 is described with reference to FIGS. 14A to 15B. Note that FIGS. 14A to 14D are plan views of the power storage device, and FIGS. 15A and 15B are cross-sectional views taken along a section line E-F and a section line G-H, respectively.

Figure 14A:
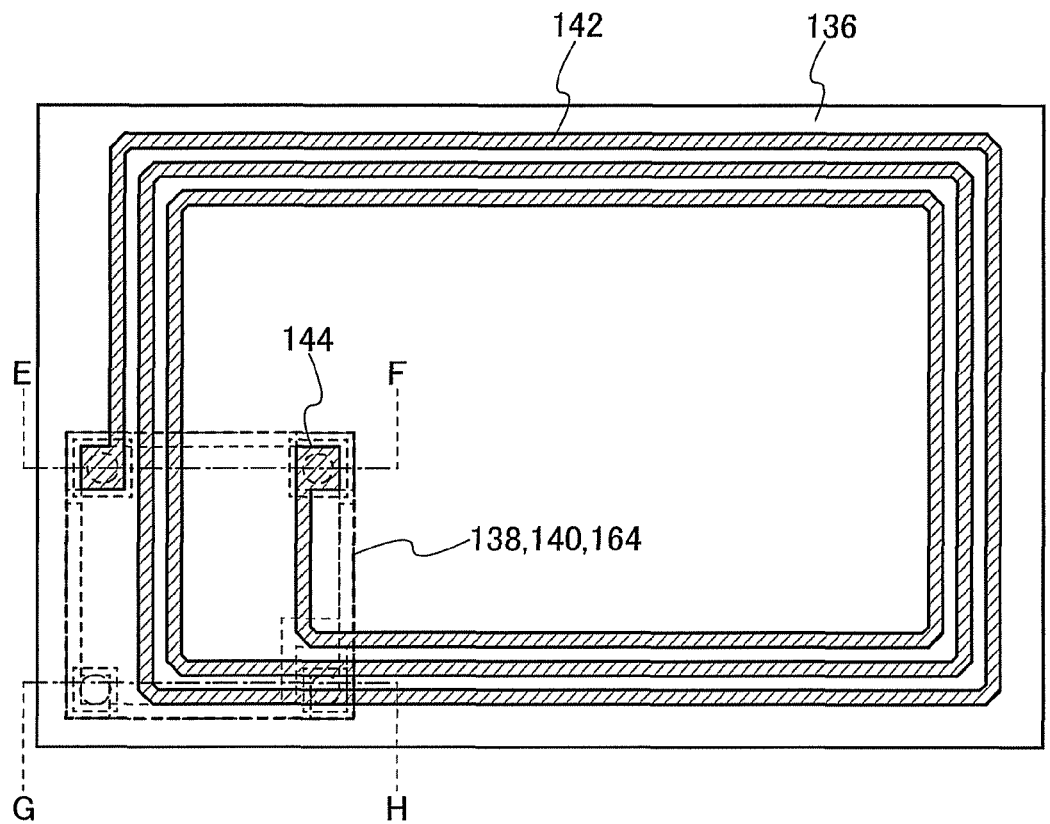
FIGS. 14A to 14D are plan views each showing a structure of the power storage device according to Embodiment Mode 5.
Figure 15A:
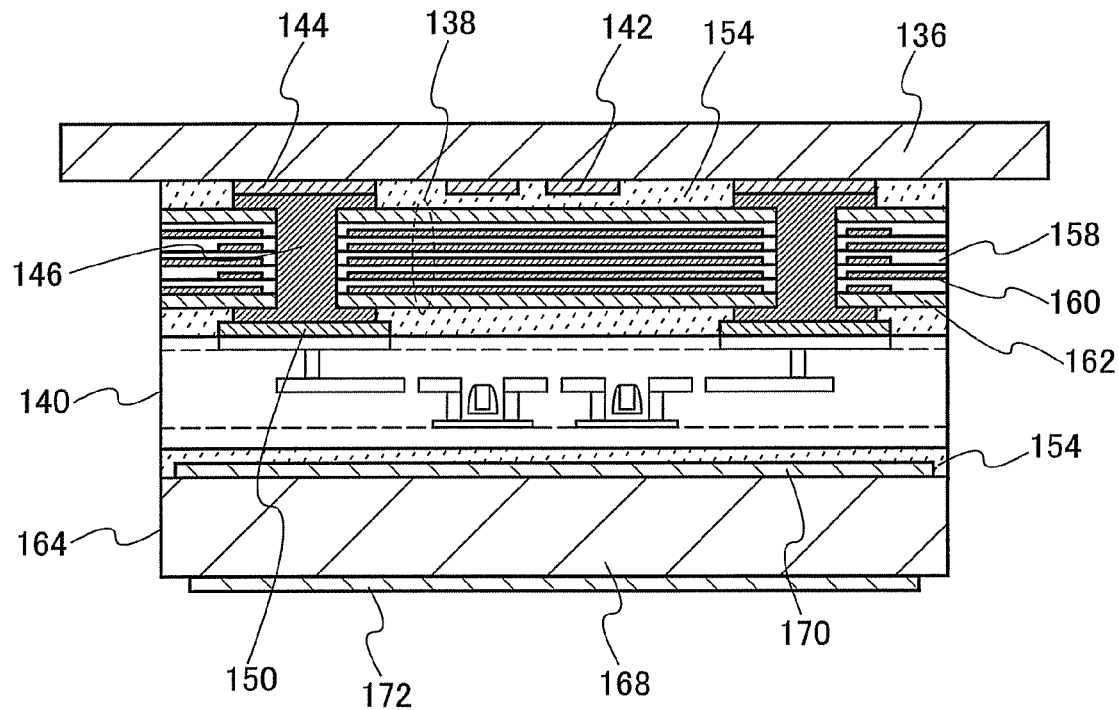
FIGS. 15A and 15B are cross-sectional views each showing a structure of the power storage device according to Embodiment Mode 5.
Figure 15B:
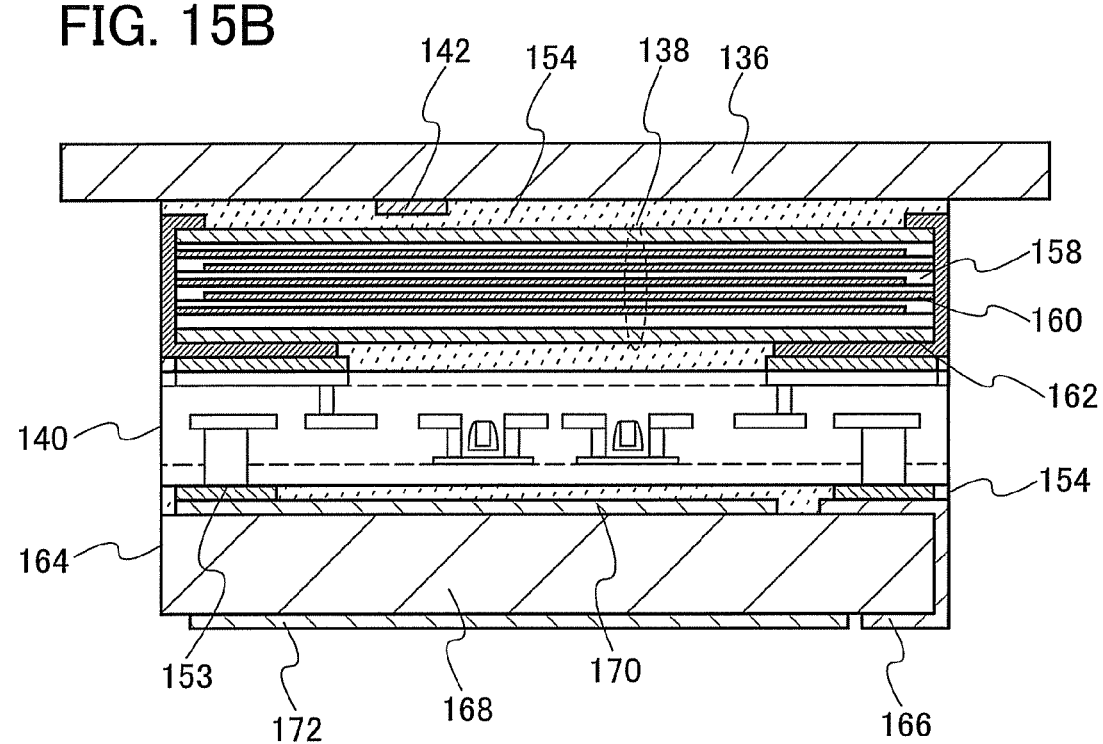

FIG. 14A shows a plan view of the power storage device. The first structure 136 is provided with the antenna 142. The antenna 142 can be changed in shape depending on frequency band used for transmission and reception of electric waves. In the power storage device, the second structure 138, the third structure 140 provided with the power storage device control circuit, and the ceramic antenna 164 are arranged in accordance with the antenna terminal 144.

Figure 14B:
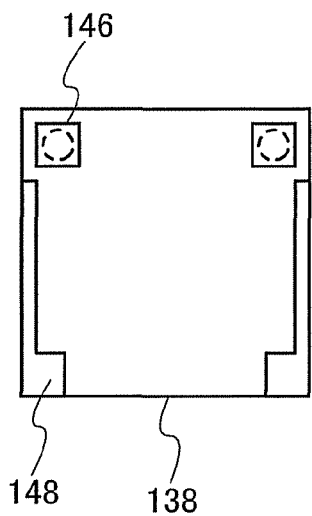
Figure 14C:
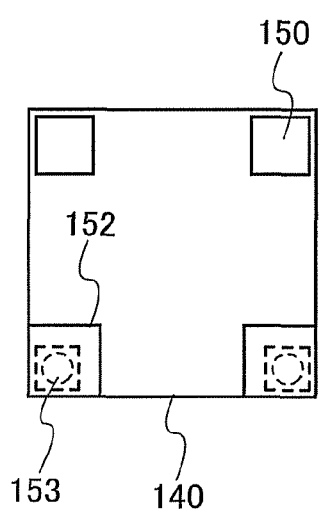
Figure 14D:
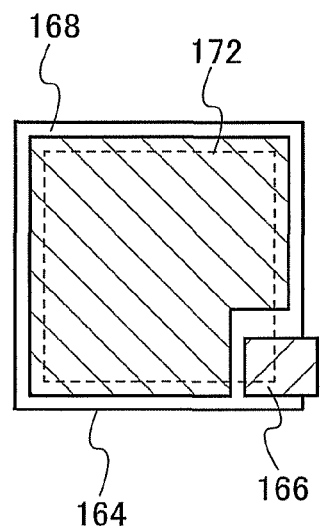

FIG. 14B is a plan view of the second structure 138; FIG. 14C is a plan view of the third structure 140 provided with the power storage device control circuit; and FIG. 14D is a plan view of the ceramic antenna 164. The second structure 138, the third structure 140 provided with the power storage device control circuit, and the ceramic antenna 164 preferably have approximately the same dimension. Alternatively, the third structure 140 provided with the power storage device control circuit may have a smaller dimension than the second structure 138 and the ceramic antenna 164.

The second structure 138 is formed of a ceramic material. The second structure 138 is provided with the through electrode 146 and the capacitor external electrode 148. The third structure 140 provided with the power storage device control circuit is provided with the connection electrode 150 connected to the antenna terminal 144, the capacitor portion connection electrode 152 connected to the capacitor external electrode 148, and the ceramic antenna connection electrode 153 connected to the ceramic antenna 164.

FIG. 15A shows a cross-sectional view taken along a section line E-F. In the second structure 138, a power storage portion is formed of a ceramic material. A structure including the through electrode 146 connecting the antenna terminal 144 of the first structure 136 and the connection electrode 150 of the third structure 140 provided with the power storage device control circuit is similar to that shown in FIG. 13A. On a back side of the third structure 140 provided with the power storage device control circuit, the ceramic antenna 164 is arranged. The second structure 138 and the ceramic antenna 164 sandwiching the third structure 140 provided with the power storage device control circuit also function as protective layers.

FIG. 15B shows a cross-sectional view taken along a section line G-H, and shows a connection structure of the third structure 140 provided with the power storage device control circuit and the ceramic antenna 164. The ceramic antenna 164 includes a ground body 170 on one side of a dielectric body 168 (on the third structure 140 side) and a reflector 172 on the other side. The third structure 140 provided with the power storage device control circuit is provided with the ceramic antenna connection electrode 153, to which the ground body 170 and a power-feeding body 166 are connected. The reflector 172 may be provided with a slit for increasing directivity. The reflector 172 and the power-feeding body 166 are arranged with a gap therebetween and are capacitively coupled.

In this power storage device, the antenna 142 formed in the first structure 136 and the ceramic antenna 164 are used as power-feeding antennas, and the power storage portion formed in the second structure 138 is charged. The power storage portion includes the dielectric layers 158 and the capacitor electrodes 160. By stacking a plurality of layers each including the dielectric layer 158 and the capacitor electrode 160, a large capacitor can be formed. In this case, the power storage portion can be efficiently charged by using electromagnetic waves with different frequencies to be received by the antenna 142 and the ceramic antenna 164. In other words, the band of electromagnetic waves received for charging the power storage portion can be widened. In this case, the dielectric layer 158 and the capacitor electrode 160 can each be formed with a thickness of 1 μm to 10 μm by using nano particles. Accordingly, a total thickness of five stacked dielectric layers 158 each having a thickness of 2 μm is 10 μm. In addition, even a total thickness of ten stacked dielectric layers 158 each having a thickness of 1 μm is 10 μm.

As described above, the power storage device combining the first structure 136 provided with the antenna, the second structure 138 provided with the power storage portion, the third structure 140 provided with the power storage device control circuit, and the ceramic antenna 164 is obtained. With the use of the second structure 138 formed of ceramic or the like and the ceramic antenna 164, reductions in size and weight and an increase in rigidity of the power storage device can be achieved. Such a power storage device can be applied to any of the wireless power supply systems of Embodiment Modes 1 to 4.

Embodiment Mode 6

This embodiment mode describes a structure of a power storage device and an example of its application. The power storage device exemplified here includes a first structure provided with an antenna, a second structure provided with a capacitor portion, and a third structure provided with a power storage device control circuit, similarly to Embodiment Mode 5.

Figure 16:
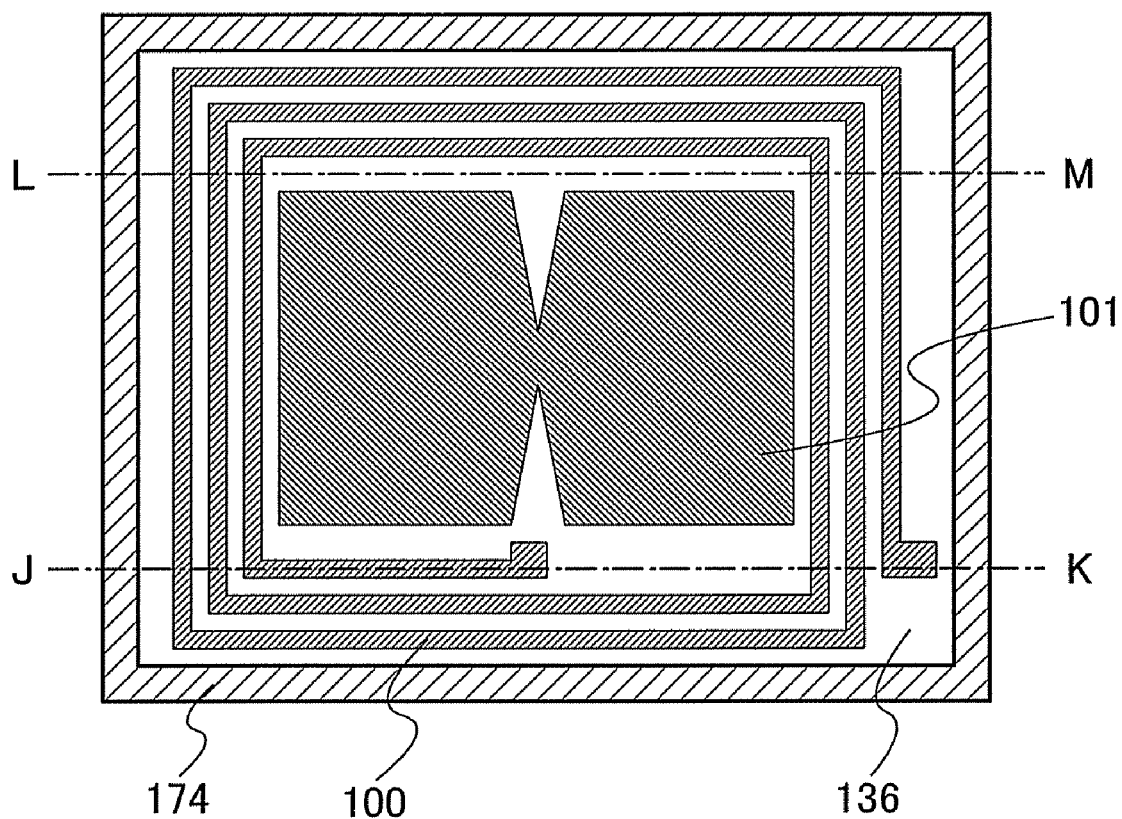
FIG. 16 is a diagram showing a planar structure of a power storage device according to Embodiment Mode 6.
Figure 17A:
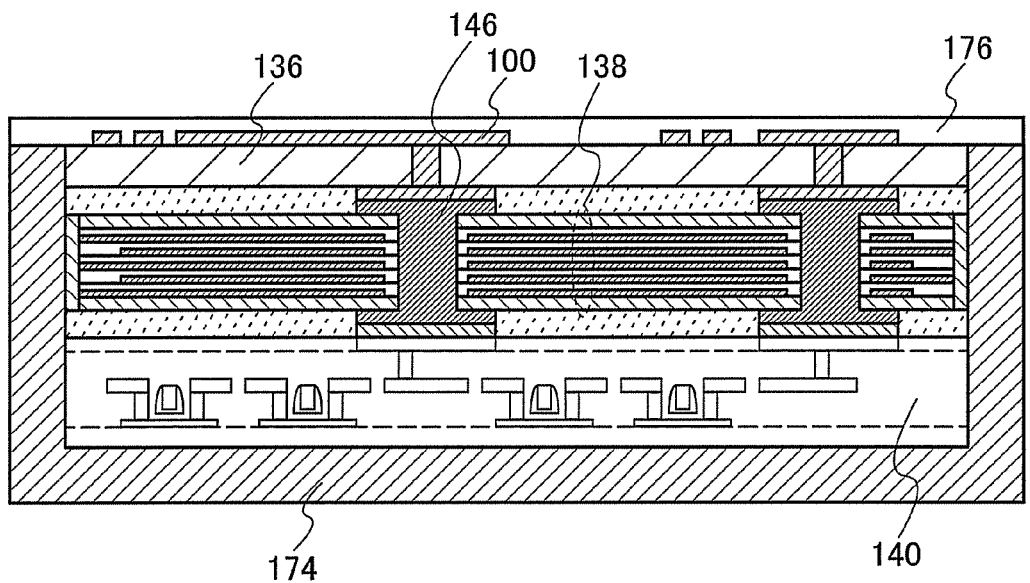
FIGS. 17A and 17B are cross-sectional views each showing a structure of the power storage device according to Embodiment Mode 6.
Figure 17B:
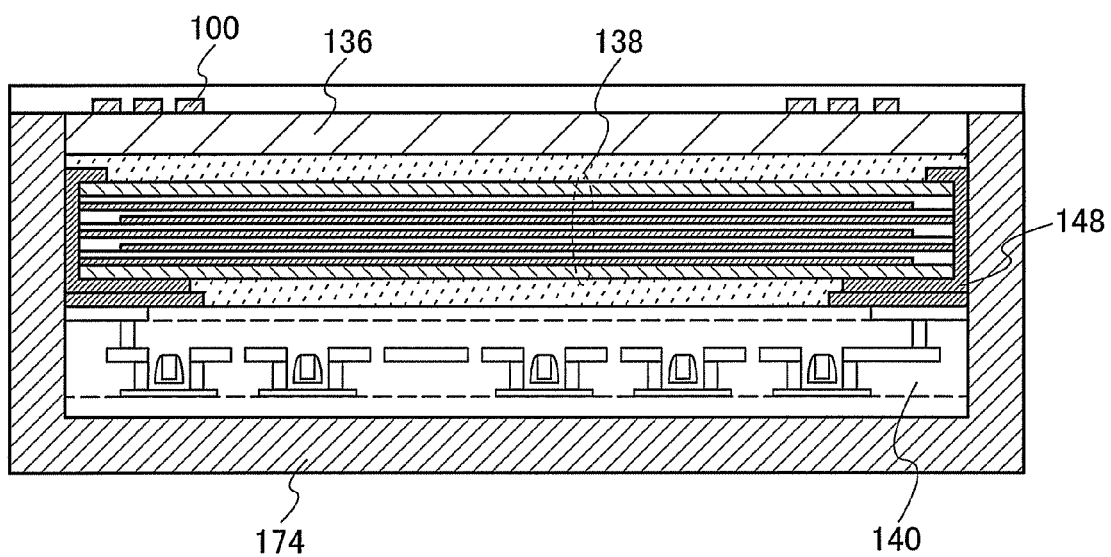

FIG. 16 shows a planar structure of the power storage device according to this embodiment mode. Cross-sectional views taken along a section line J-K and a section line L-M of the above drawing are shown in FIGS. 17A and 17B, respectively. The description below is made with reference to these diagrams. Note that the section line J-K is provided to show a connection structure of the antenna and the power storage device control circuit, and the section line L-M is provided to show a connection structure of the power storage portion and the power storage device control circuit.

The first structure 136 is provided with the antenna 100. The antenna 100 is formed over one surface of the first structure 136. On a side opposite to the surface of the first structure 136, the second structure 138 provided with the power storage portion is formed. On a back side of the second structure 138, the third structure 140 provided with the power storage device control circuit is formed.

The antenna 100 provided in the first structure 136 is connected to the power storage device control circuit formed in the third structure 140 by the through electrode 146 of the second structure 138. The antenna 100 can be formed on either or both sides of the first structure 136. The first structure 136 may be provided with a wiring which penetrates the first structure 136 in order to connect the antenna 100 to the through electrode 146. In order to protect the antenna 100, a protective film 176 may be provided over the surface of the first structure 136. The protective film 176 can be applied to various applications when its surface is formed of a bioinert material such as diamond-like carbon, silicon nitride, or alumina.

The capacitor portion formed in the second structure 138 stores electric power which is received by the antenna. The capacitor external electrode 148 is formed over a side end surface of the second structure 138 and is extended so as to be connected to the power storage device control circuit. Detailed structures of these are similar to those in Embodiment Mode 5.

The power storage device preferably has an antenna with high sensitivity in order to efficiently receive electromagnetic waves and store electric power. A multiband antenna may be used so as to be able to receive electromagnetic waves of a wide frequency band. Alternatively, a plurality of antennas may be combined. FIG. 16 shows an example of a combination of a magnetic field antenna and an electric field antenna. The antenna 100 can be used to receive electric waves of a high-frequency band (electromagnetic waves with a frequency of 1 MHz to 30 MHz) and a very high-frequency band (electromagnetic waves with a frequency of 30 MHz to 300 MHz), and an antenna 101 can be used to receive electric waves of an ultra high-frequency band (electromagnetic waves with a frequency of 0.3 GHz to 3 GHz). When an antenna is formed so as to be able to receive electric waves of a wide frequency band, it is possible to respond to the cases where different frequencies are used for chargers. For example, it is also possible to flexibly respond to the case where the power storage device is used in different environments such as in different countries or areas.

A region of the power storage device, other than a surface where the antenna is formed, is preferably structured not to leak electromagnetic waves or structured to absorb electromagnetic waves. Therefore, an electric wave absorption material 174 is provided. The electric wave absorption material 174 is provided to cover side surfaces of the second structure 138 and side surfaces and a bottom surface of the third structure 140. In other words, it is provided to cover surfaces other than the surface of the first structure 136 where the antenna 100 is formed. As the electric wave absorption material 174, various materials can be used; for example, a base material in which an electric wave absorption material is dispersed can be used. The base material may be an industrially-used resin material or plastic material. The electric wave absorption material may be carbon, ferrite, or the like. Carbon is a cluster of carbon atoms, which is called by different names such as graphite, carbon black, amorphous carbon, and the like. Ferrite is represented by chemical formula, $MO \cdot Fe_2O_3$, and M is generally Zn, Cd, Fe, Ni, Cu, Co, Mg, or the like. In this manner, by providing the electric wave absorption material 174 in the power storage device, the power storage device can be safely used even when, for example, embedded in a living body.

Figure 18A:
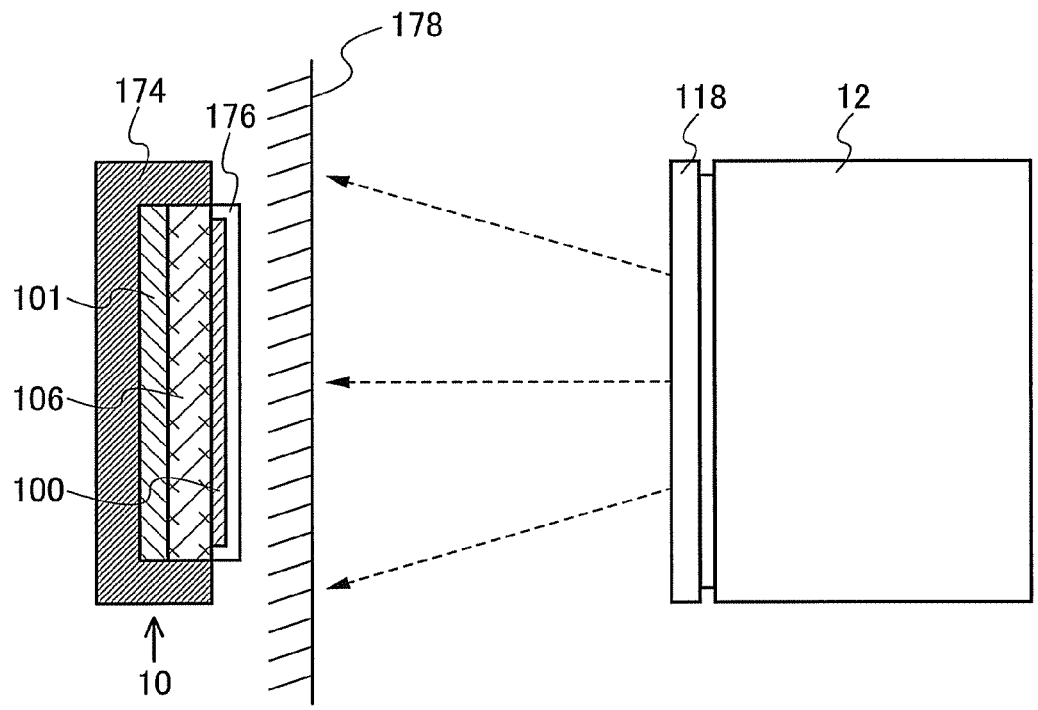
FIGS. 18A and 18B are diagrams each showing a mode in which the power storage device shown in FIGS. 17A and 17B is embedded in a living body or a solid for use.
Figure 18B:
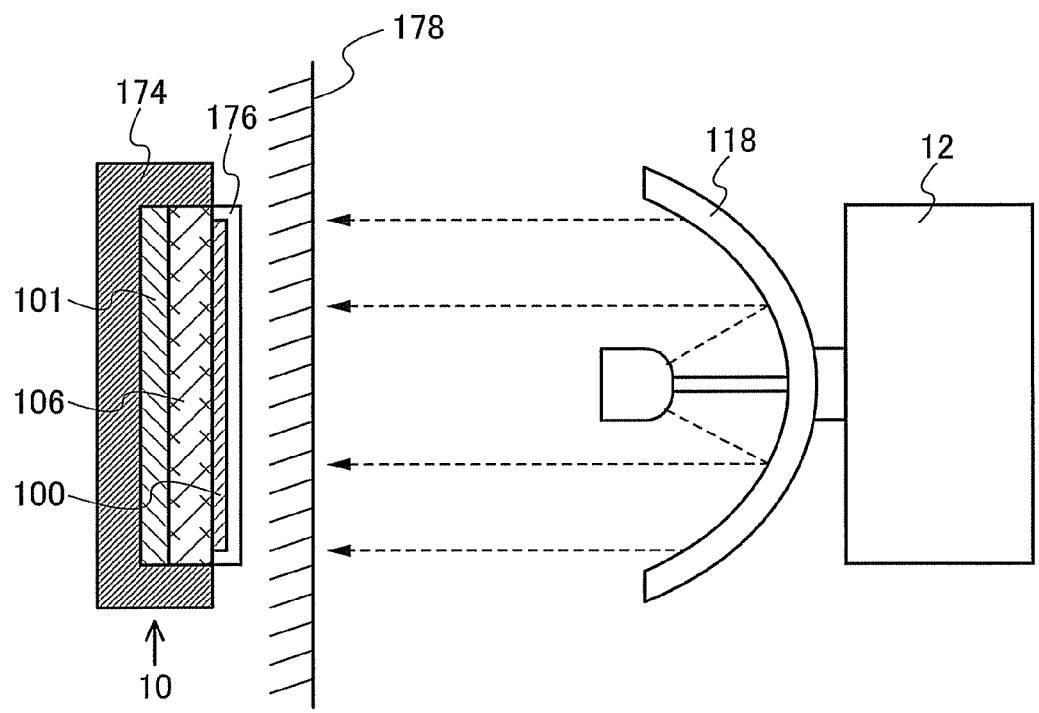

Each of FIGS. 18A and 18B shows a mode of using the power storage device shown in FIGS. 17A and 17B embedded in a living body or a solid. For such an application, the power storage device according to the present invention can be applied to a power supply portion of an electrical stimulation generation device for maintaining a function of an internal organ by application of electrical stimulation to a living body.

FIG. 18A shows a state where the power storage device 10 is provided on an inner side than a nonmetal surface 178. The nonmetal surface 178 is formed of a skin of a living body, a nonmetal material such as plastic forming a chassis of an electronic device, a piece of paper, a nonwoven fabric, a clothing material, or the like. Of the power storage device 10, a surface where the antenna 100 is formed is exposed and the other part is covered with the electric wave absorption material 174. Electromagnetic waves emitted from the antenna 118 of the terminal charging device 12 which is positioned to face the nonmetal surface 178 are transmitted through the nonmetal surface 178 and absorbed by the antenna 100 of the power storage device 10. In this case, by using a parabolic antenna as the antenna 118 of the terminal charging device 12 as shown in FIG. 18B, the directivity of electromagnetic waves is improved. In other words, when the power storage device is embedded in a living body, an unnecessary region thereof can be prevented from being exposed to electromagnetic waves. This applies to the case where the power storage device 10 is provided in a chassis of an electronic device, and the electronic device can be prevented from malfunctioning due to the influence of electromagnetic waves on the other part.

As described above, the power storage device combining the first structure 136 provided with the antenna, the second structure 138 provided with the power storage portion, the third structure 140 provided with the power storage device control circuit, and the ceramic antenna 164 is obtained. With the use of the second structure 138 formed of ceramic or the like and the ceramic antenna 164, reductions in size and weight and an increase in rigidity of the power storage device can be achieved. Such a power storage device can be applied to any of the wireless power supply systems of Embodiment Modes 1 to 4.

This application is based on Japanese Patent Application Serial No. 2006-316750 filed with Japan Patent Office on Nov. 24, 2006, the entire contents of which are hereby incorporated by reference.

What is claimed is:

1. A wireless power supply system comprising:
    a power storage device comprising a first identification information;
    a management server comprising a second identification information, the management server configured to transmit a first signal comprising an information which the first identification information is valid with reference to the second identification information; and
    a terminal charging device configured to wirelessly transmit an electric power to the power storage device in response to the first signal transmitted from the management server, thereby charging the power storage device,
    wherein the first identification information is transmitted from the power storage device to the management server through the terminal charging device before the power storage device is charged by the terminal charging device.

2. The wireless power supply system according to claim 1, wherein the management server comprises:
    a communication portion configured to receive a second signal from the terminal charging device; and
    a first storage medium configured to store the second identification information,
    wherein the terminal charging device is connected to the management server via a communication line, the terminal charging device comprising:
        a terminal communication portion configured to communicate with the management server;
        a first antenna configured to communicate with the power storage device;
        a power signal transmission portion configured to transmit the electric power to the power storage device through the first antenna in response to the first signal received from the management server; and
        a measuring portion configured to measure an amount of the electric power supplied to the power storage device, and
    wherein the power storage device comprises:
        a memory portion configured to store the first identification information;
        a second antenna configured to receive the electric power from the terminal charging device; and
        a power storage portion configured to store the electric power.

3. The wireless power supply system according to claim 2, wherein the power storage portion of the power storage device comprises a capacitor to store the electric power.

4. The wireless power supply system according to claim 2, wherein the management server further comprises a second storage medium to store usage information concerning the electric power which the power storage device received from the terminal charging device.

5. The wireless power supply system according to claim 2, wherein the communication line is a wireless communication line.

6. A wireless power supply system comprising: a power storage device comprising a first identification information; a management server comprising a second identification information, the management server configured to transmit a first signal comprising an information whether the first identification information is valid or not with reference to the second identification information; a terminal charging device configured to wirelessly transmit an electric power to the power storage device in response to the first signal transmitted from the management server, thereby charging the power storage device, wherein the first identification information is transmitted from the power storage device to the management server through the terminal charging device before the power storage device is charged by the terminal charging device.

7. The wireless power supply system according to claim 6, wherein the management server comprises:
    a communication portion configured to receive a second signal from the terminal charging device; and
    a first storage medium configured to store the second identification information,
    wherein the terminal charging device is connected to the management server via a communication line, the terminal charging device comprising:
        a terminal communication portion configured to communicate with the management server;
        a first antenna configured to communicate with the power storage device;
        a power signal transmission portion configured to transmit the electric power to the power storage device through the first antenna in response to the first signal received from the management server; and
        a measuring portion configured to measure an amount of the electric power supplied to the power storage device, and
    wherein the power storage device comprises:
        a memory portion configured to store the first identification information and an usage information;
        a display portion configured to display the usage information; and
        a second antenna configured to receive the electric power from the terminal charging device; and
        a power storage portion configured to store the electric power.

8. The wireless power supply system according to claim 7, wherein the power storage device comprises a capacitor to store the electric power.

9. The wireless power supply system according to claim 7, wherein the management server further comprises a second storage medium to store usage information concerning the electric power which the power storage device received from the terminal charging device.

10. The wireless power supply system according to claim 7, wherein the communication line is a wireless communication line.

11. A wireless power supply system comprising:
    a memory card with a power storage device comprising a first identification information;
    a management server comprising a second identification information, the management server configured to transmit a first signal comprising an information which the first identification information is valid with reference to the second identification information; and
    a terminal charging device configured to wirelessly transmit an electric power to the memory card in response to the first signal transmitted from the management server, thereby charging the memory card,
    wherein the first identification information is transmitted from the memory card to the management server through the terminal charging device before the memory card is charged by the terminal charging device.

12. The wireless power supply system according to claim 11,
wherein the management server comprises:
a communication portion configured to receive a second signal from the terminal charging device; and
a first storage medium configured to store the second identification information;
a second storage medium configured to store usage information concerning electric power charging; and
a third storage medium configured to store a second information to be provided for a user,
wherein the terminal charging device is connected to the management server via a communication line, the terminal charging device comprising:
a terminal communication portion configured to communicate with the management server;
a first antenna configured to communicate with the memory card;
a power signal transmission portion configured to transmit the electric power to the memory card through the first antenna in response to the first signal received from the management server; and
a measuring portion configured to measure an amount of the electric power supplied to the memory card, and
wherein the memory card comprises:
a memory portion configured to store the first identification information, usage information, and a third information provided for a user;
a second antenna configured to receive the electric power from the terminal charging device; and
a power storage portion configured to store the electric power and supply the electric power for memory retention to the memory portion.

13. The wireless power supply system according to claim 12, wherein the power storage portion of the memory card comprises a capacitor to store the electric power.

14. The wireless power supply system according to claim 12, wherein the memory portion of the memory card includes a nonvolatile memory configured to store the third information provided for a user.

15. The wireless power supply system according to claim 12, wherein the communication line is a wireless communication line.

16. A wireless power supply method for managing power supply comprising the steps of: reading a first identification information stored in a power storage device to a terminal charging device; transmitting the first identification information to a management server from the terminal charging device, the management server comprising a second identification information; transmitting a charge enable signal from the management server to the terminal charging device when the first identification information is valid with reference to the second identification information; inquiring of the power storage device about necessity of charging in response to the charge enable signal; wirelessly transmitting a first charge request signal from the power storage device to the terminal charging device in response to the charge enable signal; and wirelessly transmitting an electric power from the terminal charging device to the power storage device in response to the first charge request signal.

17. The wireless power supply method according to claim 16, further comprising the steps of:
measuring an amount of the electric power;
inquiring of the power storage device about necessity of charging after the step of measuring the amount of the electric power;
transmitting one of a second charge request signal and a charge non-request signal from the power storage device to the terminal charging device at an end of the transmission of the electric power; and
transmitting a information of the amount of the electric power transmitted to the power storage device from the terminal charging device to the management server in response to the charge non-request signal.

18. The wireless power supply method according to claim 17, further comprising the step of generating billing information based on the amount of the electric power stored in the management server,
wherein the management server further comprises a first storage medium storing the second identification information and a second storage medium storing the billing information.

19. The wireless power supply method according to claim 17, further comprising the steps of:
receiving accumulated charge information from the management server; and
transmitting the accumulated charge information to the power storage device.

20. The wireless power supply method according to claim 16,
wherein the management server includes a first storage medium storing the second identification information, and
wherein the terminal charging device is connected to the management server via a communication line.

21. The wireless power supply method according to claim 16, further comprising the steps of:
transmitting a charge disable signal from the management server to the terminal charging device when the first identification information is not valid with reference to the second identification information after the step of inquiring of the management server.

* * * * *